(12) United States Patent
Rohs

(10) Patent No.: US 7,971,696 B2
(45) Date of Patent: *Jul. 5, 2011

(54) DUAL MASS CLUTCH FLYWHEEL AND CLUTCH, AND A METHOD FOR MANUFACTURING SUCH DUAL MASS CLUTCH FLYWHEEL

(75) Inventor: Ulrich Rohs, Düren (DE)

(73) Assignee: Ulrich Rohs, Düren (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/657,627

(22) Filed: Jan. 25, 2010

(65) Prior Publication Data

US 2010/0139450 A1  Jun. 10, 2010

Related U.S. Application Data

(63) Continuation of application No. 10/584,389, filed as application No. PCT/DE2004/002818 on Dec. 22, 2004, now Pat. No. 7,703,591.

(30) Foreign Application Priority Data

Dec. 26, 2003  (DE) .................................. 103 61 605

(51) Int. Cl.
F16F 15/134 (2006.01)
F16F 15/139 (2006.01)

(52) U.S. Cl. ................ 192/55.61; 192/70.17; 192/214.1

(58) Field of Classification Search .................. None
See application file for complete search history.

(56) References Cited

U.S. PATENT DOCUMENTS

| | | | |
|---|---|---|---|
| 4,838,395 A | 6/1989 | Chasseguet et al. | |
| 5,092,820 A | 3/1992 | Naudin et al. | |
| 5,307,710 A | 5/1994 | Feldhaus et al. | |
| 5,863,274 A | 1/1999 | Jäckel | |
| 6,062,359 A | 5/2000 | Rohs et al. | |
| 6,371,857 B1 | 4/2002 | Kono et al. | |
| 7,703,591 B2 * | 4/2010 | Rohs ......................... | 192/55.61 |

FOREIGN PATENT DOCUMENTS

| | | |
|---|---|---|
| DE | 197 00 851 | 7/1997 |
| DE | 197 51 752 | 5/1999 |
| DE | 100 28 268 | 2/2001 |
| EP | 0 421 965 | 4/1991 |
| EP | 1 120 582 | 8/2001 |
| GB | 2 358 692 | 8/2001 |

OTHER PUBLICATIONS

International Search Report of PCT/DE2004/002818, May 2005.
English translation of the International Preliminary Report on Patentability of PCT/DE2004/002818, Mar. 2006.

* cited by examiner

Primary Examiner — Rodney H Bonck
(74) Attorney, Agent, or Firm — Collard & Roe, P.C.

(57) ABSTRACT

In order to realize an idling disengagement by simple structural means in a dual mass clutch flywheel, a separation is provided between the damper system and spring system of a torsional vibration damper in this dual mass clutch flywheel.

24 Claims, 22 Drawing Sheets

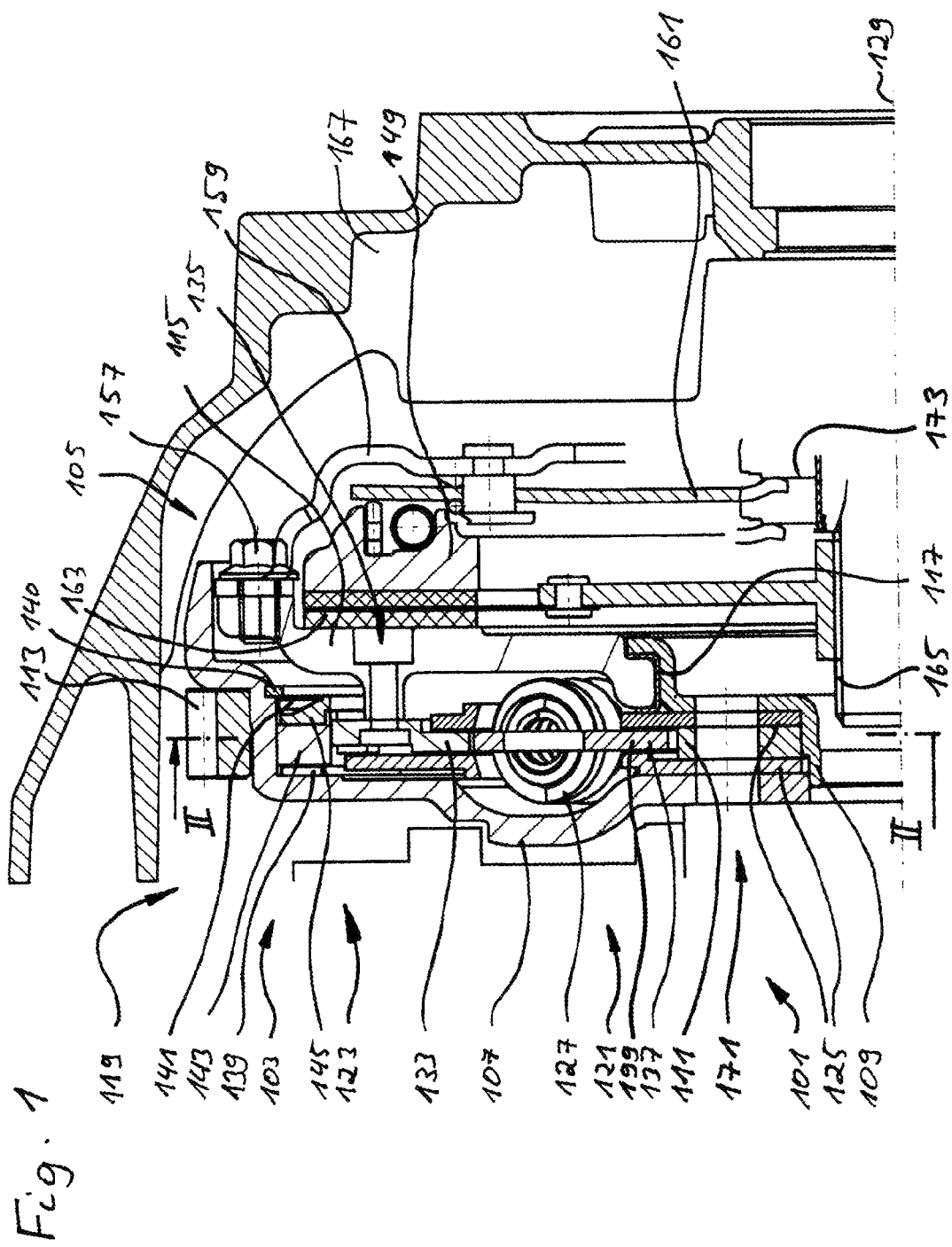

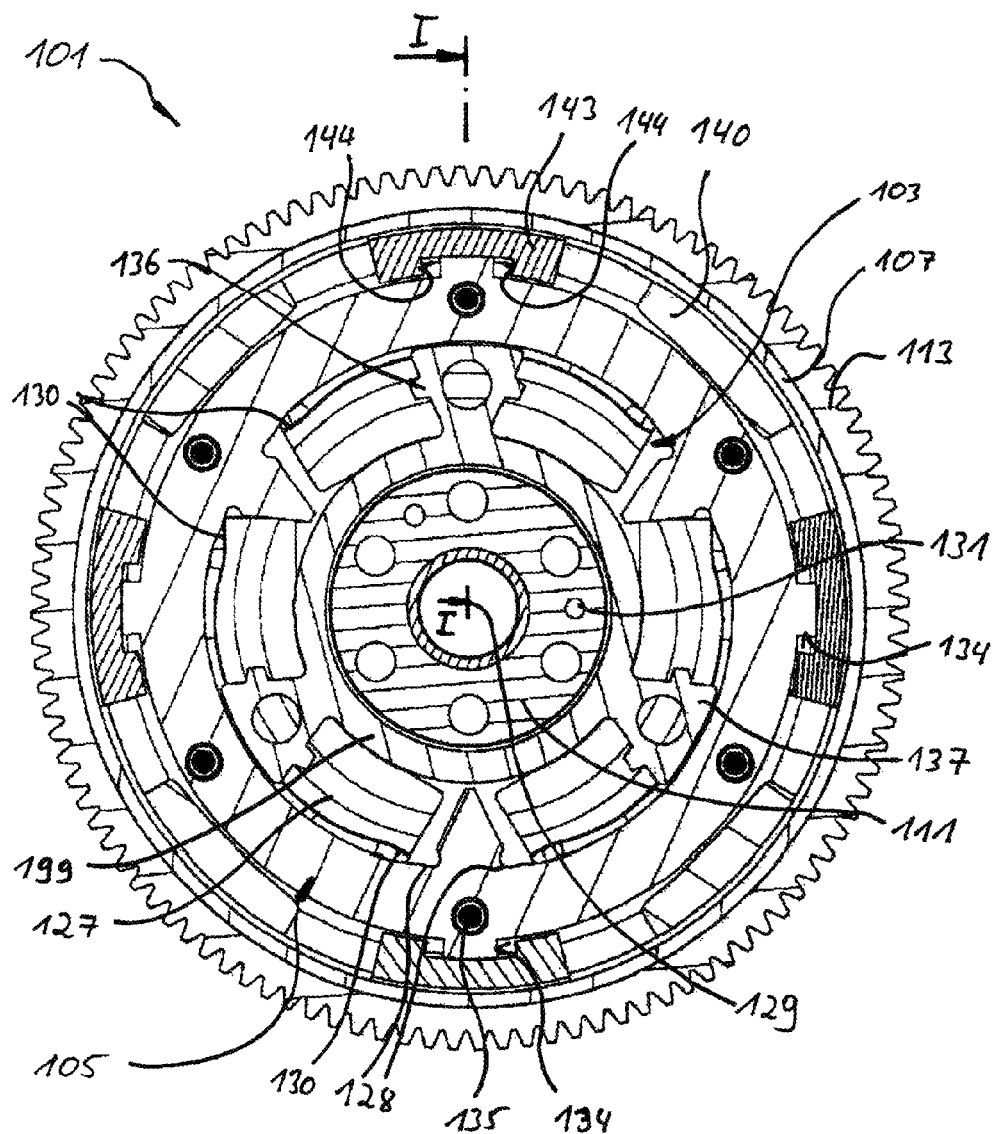

Fig. 4
Fig. 3

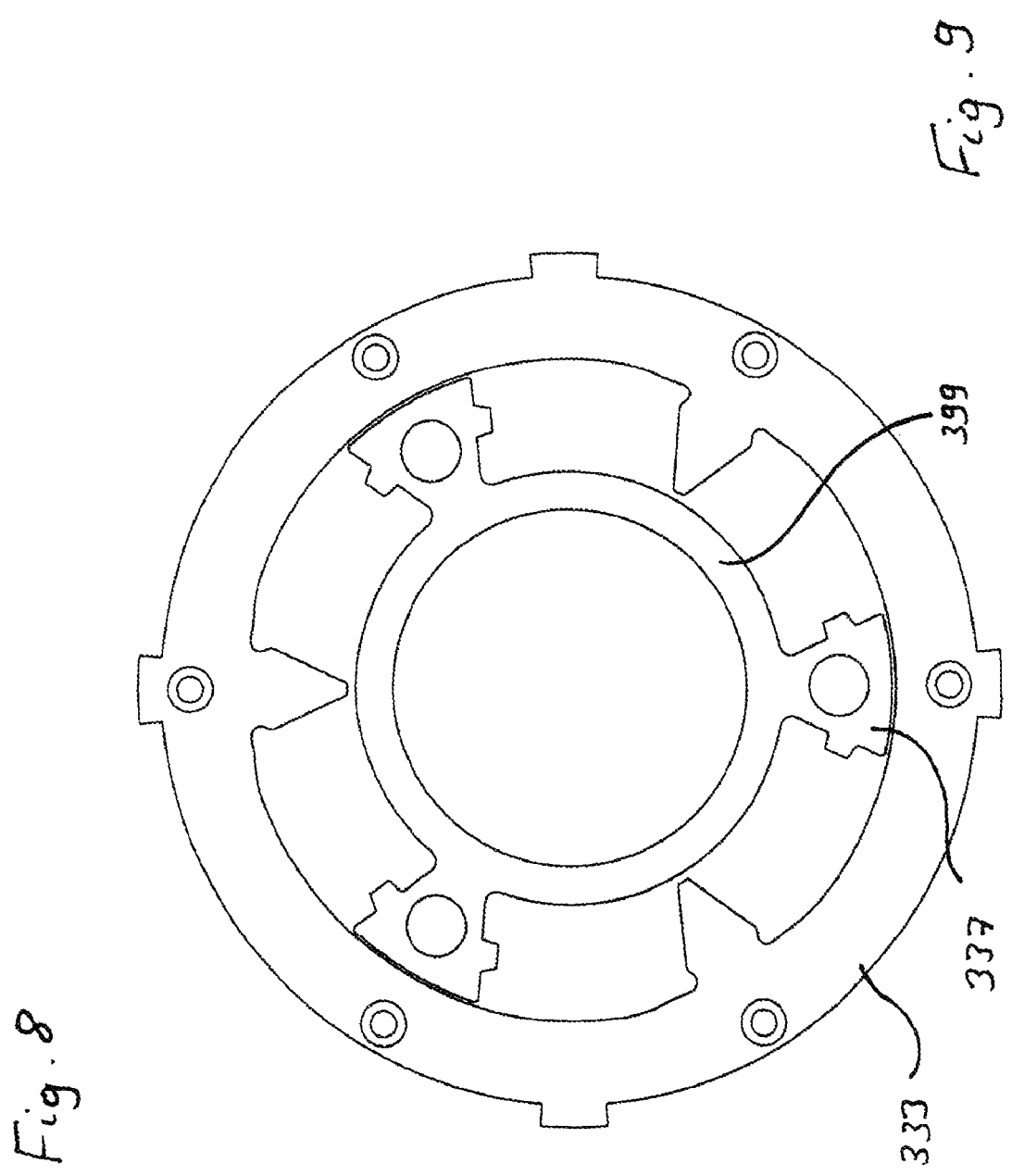

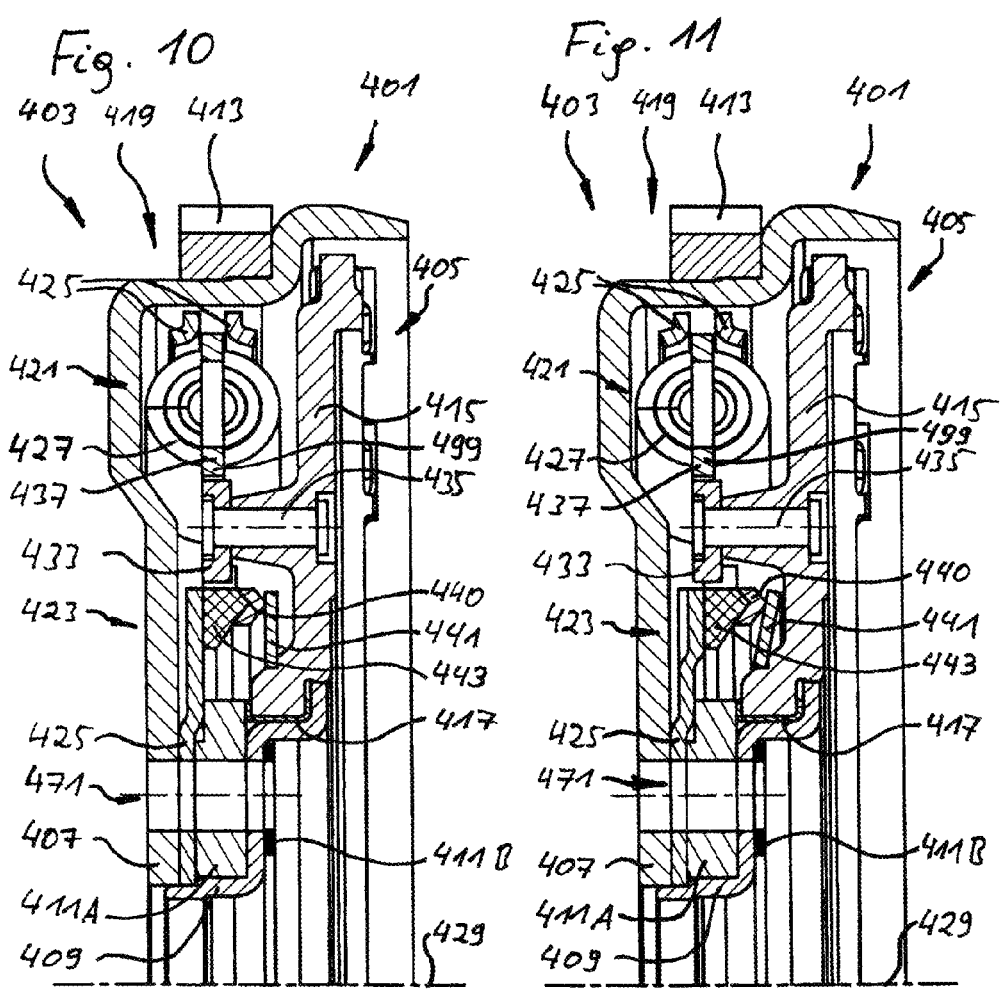

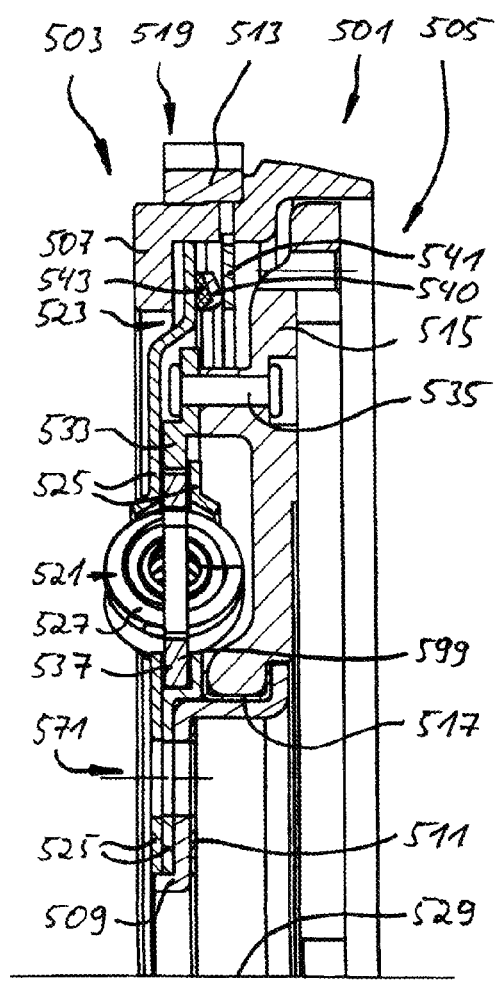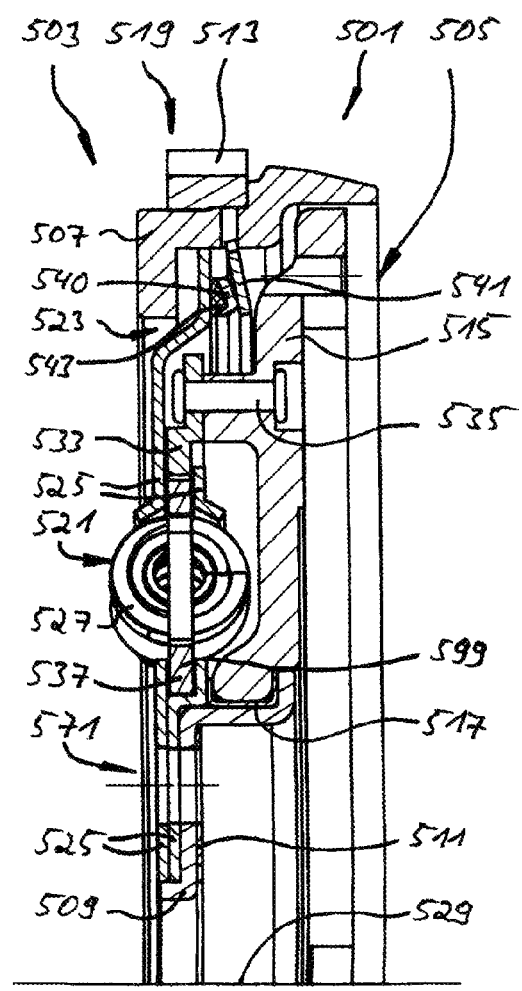

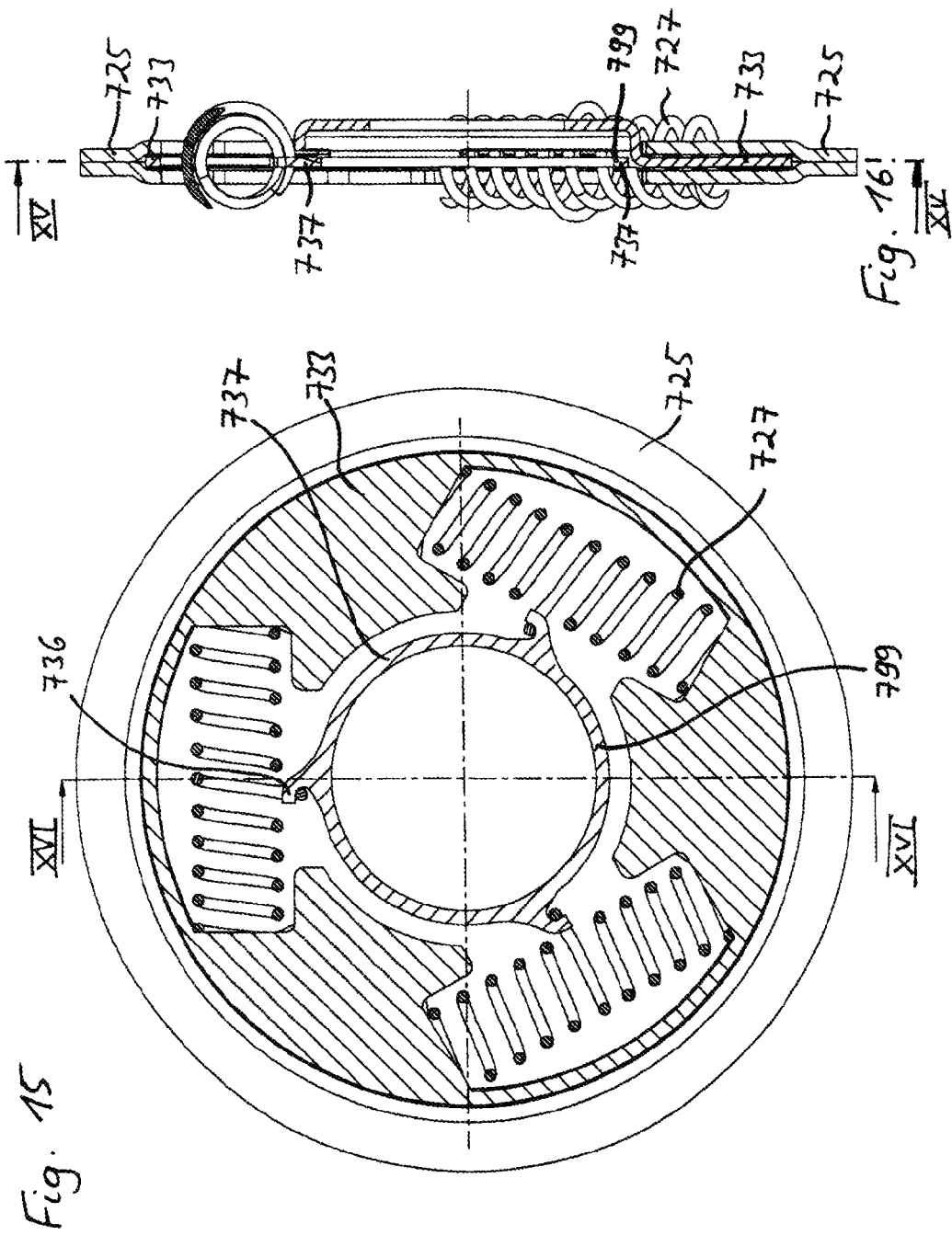

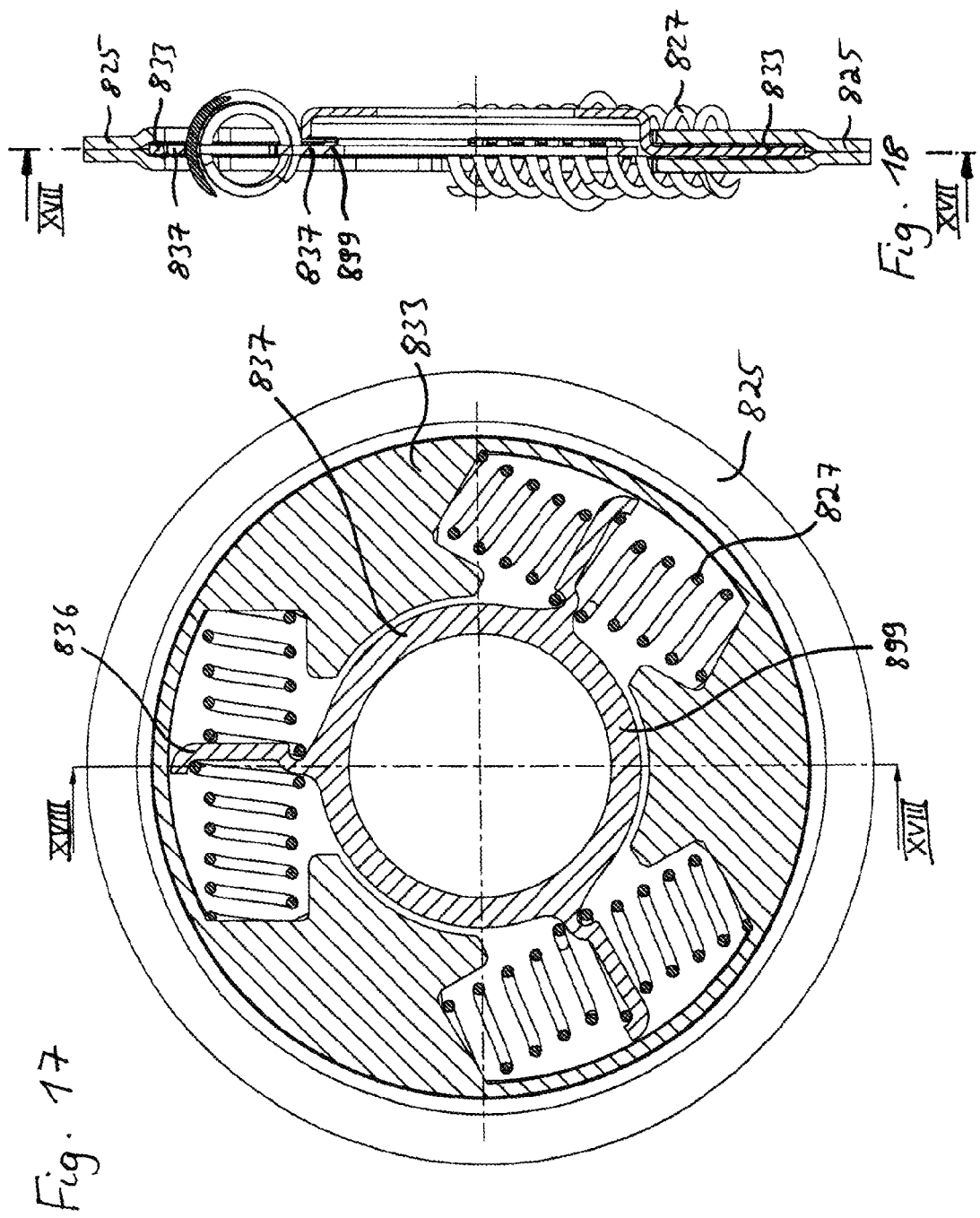

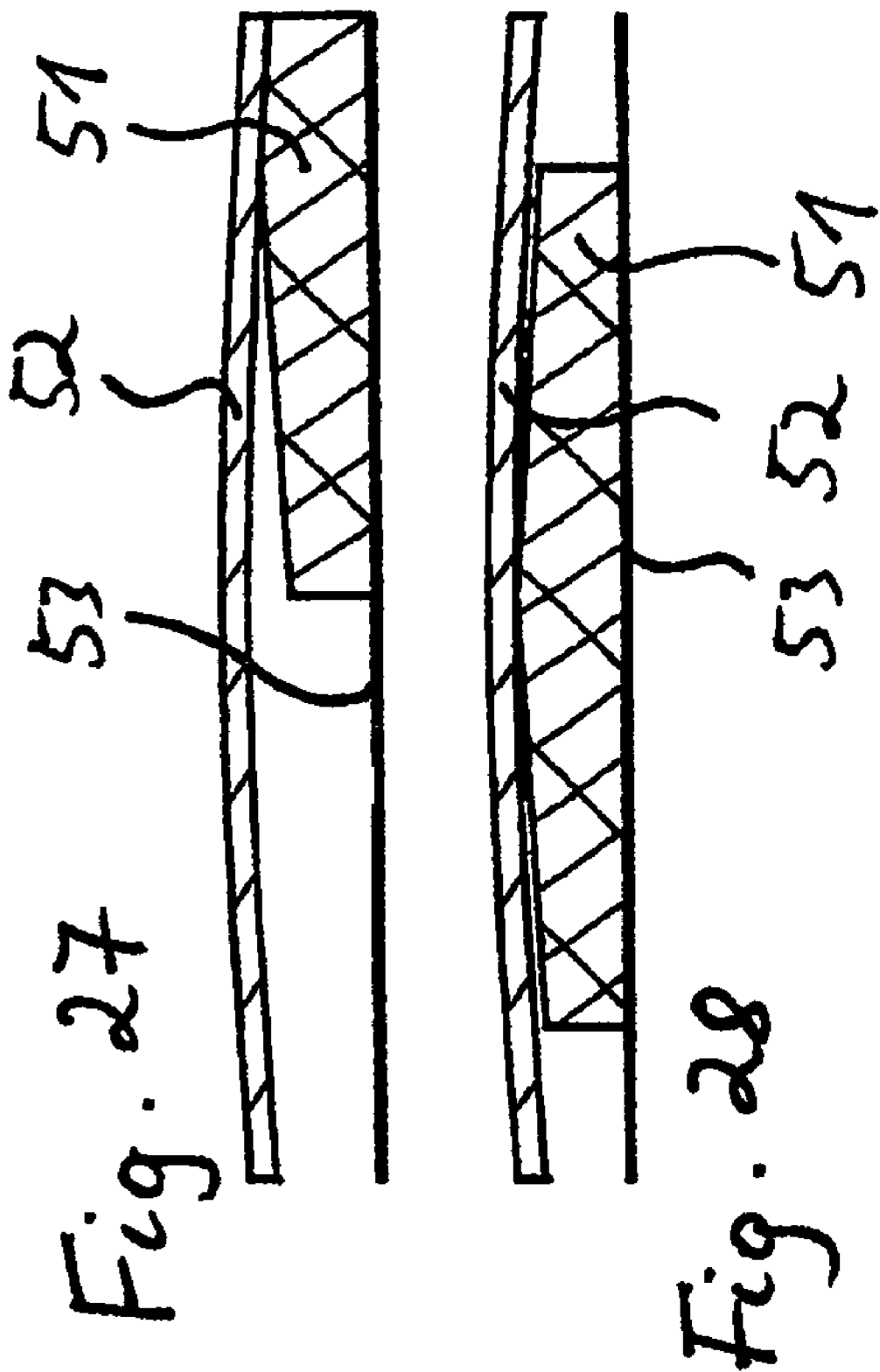

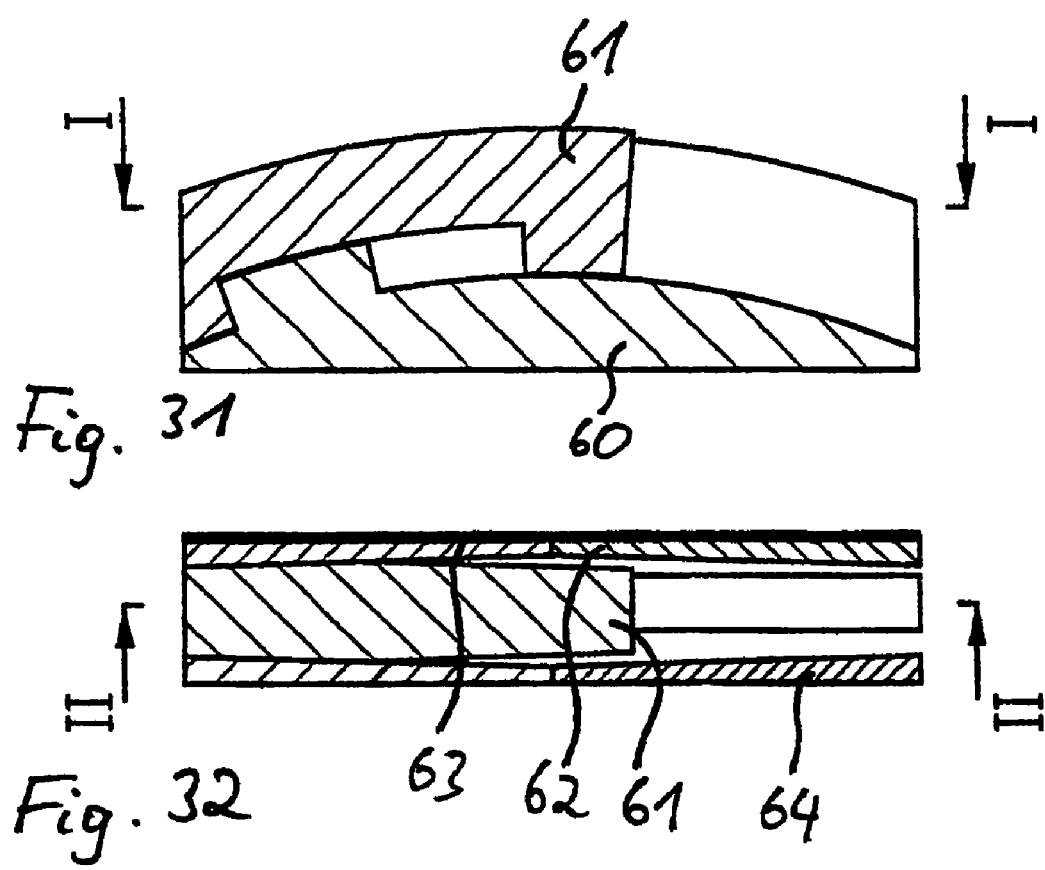

DUAL MASS CLUTCH FLYWHEEL AND CLUTCH, AND A METHOD FOR MANUFACTURING SUCH DUAL MASS CLUTCH FLYWHEEL

CROSS REFERENCE TO RELATED APPLICATIONS

This application is a continuation and claims priority under 35 U.S.C.§120 of U.S. patent application Ser. No. 10/584,389 filed on Nov. 2, 2006 now U.S. Pat. No. 7,703,591, which application claims the benefit as a National Stage entry of a PCT application pursuant to 35 U.S.C.§371 of International Application No. PCT/DE2004/002818 filed on Dec. 22, 2004, published in the German language, which in turn claims priority under 35 U.S.C.§119 of German Application No. 103 61 605.5 filed on Dec. 26, 2003.

BACKGROUND OF THE INVENTION

1. Field of the Invention

The invention relates to a dual mass clutch flywheel which is able to rotate about a main axis of rotation and comprises two masses and a torsional vibration damper, which is capable of damping rotary vibrations by means of a spring damper device acting between the two masses. For this purpose the spring-damper device has a spring system and a damper system. In a load-free condition, both masses are able to rotate in an idling position about the main axis of rotation, and in a loaded condition are able to rotate against the spring-damper device about a main axis of rotation, offset by a relative angle to each other. Here the spring system has springs which are guided by hold-down devices radially to the main axis of rotation, which devices are connected to each other by means of a fly ring, wherein the fly ring is freely able to follow the springs at least over a small relative idling angle around the idling position.

2. Description of the Related Art

A multiplicity of dual mass clutch flywheels is known from the state of the art, in which two masses are connected to a torsional vibration damper whose springs are guided by sliding shoes which are supported radially on the outside of a component of one of the masses. An example of this is disclosed in DE 197 00 851 A1. Whilst the friction of these sliding shoes on the corresponding mass results in a damping which is desirable in itself, this is highly speed dependent, which in turn leads to major matching problems since such dual mass clutch flywheels are operated at greatly varying speeds. For this reason there are dual mass clutch flywheels in which the sliding shoes are connected to each other by a fly ring, which is disclosed in DE 100 28 268 A1. Nevertheless the sliding shoes still rub against one of the two masses, although a dependency on centrifugal force is prevented by the fly ring connecting the sliding shoes, so that the fly ring which is rigidly connected to the sliding shoes correspondingly rubs against this mass and is not free.

On the other hand, EP 0 421 965 A1 discloses a free fly ring which is mounted freely rotatably between the two masses and engage in the springs by means of noses, which springs in turn rest on one of the two masses, and therefore rub against it. To this extent a friction or damping dependent on centrifugal force is prevented by the fly ring in this arrangement.

For example, a non-generic hydrodynamic power transmitter is also known from DE 197 51 752 A1, which transmitter comprises a torsional vibration damper with a spring-damper device, wherein the spring-damper device comprises a spring system with a flyer which supports two helical spring parts against centrifugal forces. This arrangement, however, is a dual mass clutch flywheel with a frictionally acting damper part which does not become active between masses spring mounted by a spring part, but instead idling damping takes place due to the intrinsic characteristics of the hydrodynamic power transmitter. The situation is different in the generic arrangements according to DE 100 28 268 A1 or EP 0 421 965 A1, in which idling disengaging is an essential element and can only be realized at considerable cost and incurring other disadvantages.

SUMMARY OF THE INVENTION

The object of this invention is to provide a dual mass clutch flywheel which, compared with the dual mass clutch flywheels of prior art, provides a good idling disengaging of the two masses in a structurally simple manner, yet has good damping characteristics at higher vibration amplitudes.

To achieve this the invention proposes a dual mass clutch flywheel which is able to rotate about a main axis of rotation and comprises two masses and a torsional vibration damper which is capable of damping rotational vibrations by means of a spring-damper device acting between the two masses, with a spring system and a damper system, wherein the two masses, in a load-free condition, are able to rotate in an idling position about the main axis of rotation, and in the loaded condition are able to rotate about the main axis of rotation against the spring-damper device, offset at an angle relative to each other, which flywheel is characterized in that the spring system has springs which are guided by hold-down devices radially to the main axis of rotation, which devices are connected to each other by means of a fly ring, wherein the fly ring is able freely to follow the springs over at least a small relative idling angle about the idling position, and wherein the springs are mounted freely in the region of the hold-down device.

The basic concept of the invention is that an excellent idling disengagement can be guaranteed with relatively simple means by means of the separation that has essentially been achieved between the resilient, frictional and hence damping functionality of the spring-damper device, whilst higher damping values can be realized without difficulty by the damping part at high amplitudes.

In this connection the term "free" describes a condition of a component without essential frictional contact with a further component. It is self-evident that such a component may be mounted in sliding or rolling bearings, if necessary. However, this must not be confused with bearing shoes for the springs, which shoes are provided in the radially outward direction, and hence also make a considerable contribution to damping even at the smallest frictional forces, due to the radial distance from the main axis of rotation, or with an arrangement where the springs are mounted on one of the two masses, as this is the case according to the state of the art.

To this extent the fly ring in question is mounted at least in a relative angle region about its idling position, the relative idling angle region, with low friction, preferably no friction, and is therefore able to follow a spring movement without obstruction. It must be emphasized here that the spring ring, together with the remaining components of the dual mass clutch flywheel, rotates about the main axis of rotation, according to the torque or torsional vibrations produced, giving rise to the displacement of the springs due to a displacement of the two masses. The hold-down devices holding down the springs, and are therefore prevented from moving radially outwards due to the centrifugal force, guarantee that the springs are also free, at least in the region of the hold-down devices. Here the term "free" covers, in particular, devices in which components that are displaced due to the rotary vibrations do not come into frictional contact with each other.

Such a dual mass clutch flywheel comprises, in particular, as already indicated, a split clutch flywheel, both of whose partial masses are coupled together by means of a torsional vibration damper. To this extent the entire arrangement rotates according to the rotation of the associated drive line about its main axis. If torques, torque fluctuations, impacts or the like occur, both masses are displaced relative to each other against the spring forces of the torsional vibration by an angle relative to the main axis of rotation, whilst the two masses, just as the other components of the dual mass clutch flywheel, rotate further about the main axis of rotation. Correspondingly the other components, which follow the relative displacement of the two masses, such as parts of the springs, arms transmitting forces, friction discs or even the fly ring, perform a movement at least relative to one of the two masses. Whilst in this case the springs only intrinsically permit a movement of the two masses, damper parts are provided, such as friction discs or friction surfaces on which the relative rotation energy is converted to heat, so that the dual mass clutch flywheel exerts a damping action.

It is self-evident that energy is dissipated in the springs within very close limits if they are upset. Similarly, heat can be dissipated by friction between the spring turns. However, the energy dissipations are negligible in proportion to the energy losses which occur due to frictional components. It is also self-evident that a friction device, within certain limits, exerts a spring action until adhesive friction, for example, is overcome. Such resilient proportions are generally negligible when compared with the springs themselves. However, it is essential, according to the invention, that a separation is made between the spring part and the damper part so that a good idling disengagement can be achieved, as will be explained in greater detail below.

According to normal practice all components which are connected rigidly to one of the two masses, such as arms transmitting forces or discs or a bearing surface or the like permanently provided on a mass, are described as belonging to that mass since they contribute to the moment of inertia of the mass concerned, according to their radial distance from the main axis of rotation.

Preferably there is an adequate separation between the two functionalities "suspension" and "separation" when the spring system applies less than 20%, in particular less than 10% of the maximum friction of the spring-damper device compared to a damper system of the spring-damper device. This applies particularly in the region of the idling position, whilst at larger relative angles the contribution of the spring system may if anything increase slightly due to friction of the spring turns against each other.

The spring system and the damper system of the spring-damper device are preferably arranged on different radii of the main axis of rotation, which enables a separation to be made more easily, structurally, between the suspension and damping. In this case it is particularly advantageous for the damper system to be arranged radially outwards since forces generated there then require a greater torque. Similarly, the influence of frictional forces on the spring system is reduced if the latter are arranged radially inwards. Although this arrangement requires the use of stronger springs in order to be able to apply the same torques through the springs, this particular arrangement is preferred for a separation of the two functionalities. It is self-evident that the radial arrangements can also be exchanged if the friction in the spring system can be controlled.

In order to control the friction in the spring system it may be cumulatively or alternatively advantageous to design components on which the springs rest, but from which they are raised during a relative movement of the two masses of a dual mass clutch flywheel in the peripheral direction so that they are also separated from the springs radially on the outside. This can be achieved, for example, in the case of plates gripping the springs, such as a primary or secondary side spring plate or double plate. In this case the windows expand in the peripheral direction, preferably inwards and radially outwards, and in particular from the side on which the springs rest.

A saddle, on which the springs can rest, with stable guidance, is preferably also provided on this side.

If both masses, the primary mass and secondary mass, are displaced relative to each other in such an arrangement, the contact side of one of the two masses is raised from the spring, whilst the contact side of the other mass supports the spring. On the opposite side of each window the conditions are the reverse. Because of the expansion of the windows the window frame is separated from the spring so that the spring is only in contact with the saddle points and with the contact sides which perform an identical relative movement. This therefore minimizes any friction on the radial outer edge of the windows between the spring and the components surrounding the springs.

Such an embodiment is advantageous, independently of all the other characteristics of this invention, for all components on which the springs rest in the peripheral direction and from which they can be separated during a relative rotation of the two masses. For this purpose these components can expand from the contact side in the direction of the springs, particularly on their radial outward side.

The dual mass clutch flywheel preferably has a friction device which comprises at least one frictional surface whose normal vector has an axial component. A friction device of such a design is also advantageous, independently of all the characteristics of this invention, since it minimizes the influence dependent on the centrifugal force on the friction.

In particular, the dual mass clutch flywheel may, cumulatively or alternatively, have a friction device which comprises at least one frictional surface which varies axially in the peripheral direction. As a result frictional forces can be set specifically and at comparatively little expense as a function of the relative angle of distortion between the primary and secondary masses.

The friction device may, cumulatively or alternatively, comprise at least two wedges which are secured to an axially peripheral component, preferably to a pressure plate. Consequently the centrifugal forces of the friction wedges preferably compensate each other so that the friction device is able to operate independently of the speed of a dual mass clutch flywheel and reliably pass through its characteristic curve. A pressure plate can also guarantee, cumulatively or alternatively, a uniform exertion of pressure on the friction wedges, preferably independently of a cup spring applying the compressive force.

The friction wedges and/or friction ramps or friction ramp rings are preferably manufactured from very intrinsically stiff materials, in particular as volume material with intrinsic stiffness, i.e. metal materials or hard plastics. This minimizes resilient effects which would otherwise oppose functional separation between the damper part and the spring part. It is self-evident that such a choice of material is also correspondingly advantageous, independently of all the other characteristics of this invention.

Friction lining materials—in particular are considered for the friction wedges and/or the friction ramps or friction ramp rings. Either the friction wedges or the friction ramps are preferably of metal, and the component rubbing on the metal is preferably a friction lining, since this combination of materials is sufficiently well known in brakes and clutches, particularly for motor vehicles, and has been tested for its characteristics. The material costs can in this case be reduced by the use of individual wedges or ramps of friction plastics, particularly if they are secured radially by peripheral metal components such as cup springs or pressure plates, as already explained above. Here the connection between the metal components and the plastics may be made by every conceivable method, in particular by injection moulding, engaging or the like. Anti-swiveling clamping connections are also advantageous under certain circumstances. The use of individual friction wedges or friction ramps is also advantageous in dual mass clutch flywheels, independently of all the other characteristics of this invention.

A steel plate with an embossed friction ramp or other metal component with ramps may be provided for a ramp ring of a friction device in a dual mass clutch flywheel, against which plate friction wedges rub. In particular, a component that is present in any case, e.g. a primary side or secondary side steel plate, can be used correspondingly. On the other hand, a cup spring may also be of an undulating shape or provided with ramps or friction ramps in order to generate varying compressive forces when interacting with other ramps or wedges. Such a design of the ramps is advantageous, independently of all the other characteristics of this invention, since it is very economical.

A pressing cup spring for the friction device is on the one hand able to rest freely on the corresponding components on which it is supported provided that no torque is transmitted through it. If this should be the case, it may advantageously be connected to the corresponding component or components by a clamping connection acting in the peripheral direction, for example a toothing. If it proves necessary to secure a cup spring axially, it may, for example, be arranged in a peripheral groove of the corresponding component pointing radially inwards or radially outwards. For assembly the cup spring is then clamped and opened suitably radially to engage in the groove. Alternatively the cup spring may also be secured by means of a crimp connection by suitably positioning it, then crimping or caulking the appropriate component.

Cumulatively or alternatively to the characteristics of this invention, it may be advantageous in a dual mass clutch flywheel for plates which transmit torque from one of the two masses to a spring-damper device, and which are of dual design, to be designed of identical material with the same strength so that they can be manufactured from one material, e.g. from a steel plate. This has the added advantage that they are rendered intrinsically stiffer and more warp resistant due to the dual design, and are also better able to resist tipping moments. In particular, it is advantageous for both these components to be designed symmetrically so that the identical tool can be used for this purpose.

Moreover, a flying spring plate can designed, cumulatively or alternatively, with the same strength and from an identical material as a primary side or secondary side plate which transmits torque from one of the two masses to a spring-damper device. In this case it does not matter whether it is a double plate or a single plate. Since the flying spring plate runs essentially on another radius, as does at least one of the two primary or secondary side plates, it can not only be manufactured from the same material but also from the identical area of a steel plate from which the corresponding primary or secondary side plate is also manufactured. This represents a considerable saving in material costs, to the extent that no additional material costs at all are incurred by the free spring plate.

This has the added advantage that with the same plate thicknesses the corresponding components also opposite the torques generated with an identical behaviour, enabling the entire arrangement to be better controlled.

A primary side spring plate may be designed as a membrane, independently of all the other characteristics of this invention. This enables a dual mass clutch flywheel also to absorb axial vibrations before they reach the secondary mass.

At least one plate of a dual mass clutch flywheel transmitting a torque can interact directly and frictionally, either cumulatively or alternatively, with a friction element. This requires a dual mass clutch flywheel design that has few components and is therefore low cost. In this case the plate can vary in the axial direction, in a peripheral region in which the friction element is located, so that correspondingly varying frictional forces can be applied. A primary or secondary side spring plate can preferably be used as the plate.

Hold-down devices are preferably used for a dual mass clutch flywheel according to the invention, which devices are located between springs on both sides in the peripheral direction and therefore slit-shown differently—a spring arranged between two mechanisms on the primary and secondary mass respectively, into two parts. Nevertheless it may be advantageous to provide long springs. For this reason it is proposed, independently of all the other characteristics of this invention, that the hold-down devices each engage in a spring and pass through it on the inside. Such hold-down devices are extremely space-saving to install, which is an advantage over the hold-down devices disclosed in DE 100 28 268 A1, since, in particular, they require no installation space in the axial direction.

Preferably the spring system has rectilinear springs which are guided radially by hold-down devices to the main axis of rotation, which devices are connected to each other by means of a fly ring. Rectilinear springs intrinsically have a rectilinear spring axis, but they may also be of bulbous design or provided with individual offset spring turns. Taking such a measure initially reduces the costs of manufacturing a generic dual mass clutch flywheel, independently of all the other characteristics of this invention. Nevertheless, the hold-down devices can guarantee a long spring path, which is advantageous for the characteristics of such a dual mass clutch flywheel in terms of its damping characteristics, since, through the use of the hold-down devices, either two springs can be connected in series or long springs can be retained in their position, and therefore components moving radially outwards relative to the springs can be prevented from exerting friction under operating conditions. Here it has been found that the latter characteristic is also advantageous, independently of all the other characteristics of the invention, for separating the damper parts and the spring parts of the corresponding torsional vibration damper functionally, as far as possible, in the manner according to the invention.

A component of the secondary mass transmitting torque in the direction of the primary mass can be connected to the secondary plate which supports the frictional surface for the clutch by a riveted joint countersunk in the secondary plate. Such a connection has the advantage, in the manufacture of the dual mass clutch flywheel, independently of all the other characteristics of this invention, that the secondary plate need only be machined on one side. To this extent the secondary plate can be manufactured by relatively simple production methods, particularly casting, at low cost, since it need only be re-machined on one side, which is also advantages independently of all the other characteristics of this invention.

This re-machining may only be carried out, for example, on the flange of the secondary plate in the region in which a sliding bearing is provided. Moreover, any other point on the secondary plate on the engine side or facing the primary side may be advantageously used for this purpose. In the subsequent riveting the dimension for the riveted joint and hence the position between the secondary plate and the component to be secured to it can then be determined from this point on the engine or primary side.

It should be emphasized that in a dual mass clutch flywheel at least one secondary side is provided which has a frictional surface which interacts with the friction disc of a friction clutch and a clutch pressure plate that can be actuated, which pressure late is in turn rigidly connected to the secondary mass and comprises the friction disc on the side other than that of the frictional surface of the secondary mass. On the other hand, the friction disc serves in this arrangement as a driven element and is generally positioned on a driven shaft.

BRIEF DESCRIPTION OF THE DRAWINGS

Further advantages, objectives and characteristics of this invention are explained with reference to the following description of the attached drawing, in which two exemplary embodiments of this invention are shown. In the drawing:

FIG. 1 shows a first dual mass clutch flywheel according to the invention, in its installation position in a radial section along line I-I in FIG. 2;

FIG. 2 shows the dual mass clutch flywheel according to FIG. 1 in a cross-section along line II-II in FIG. 1;

FIG. 3 shows a second dual mass clutch flywheel according to the invention in a similar representation to FIG. 1, in a section along line III-III in FIG. 5;

FIG. 4 shows the second dual mass clutch flywheel in a section along line IV-IV in FIG. 5;

FIG. 8 shows an elevation of the punched out parts according to FIG. 7;

FIG. 9 shows a section through the representation shown in FIG. 8;

FIG. 10 shows a third dual mass clutch flywheel in an identical section to FIG. 3;

FIG. 11 shows the third dual mass clutch flywheel in a relative displacement between the primary and secondary mass in a section through these two masses identical to the section shown in FIG. 10;

FIG. 12 shows a fourth dual mass clutch flywheel in an identical section to FIG. 3;

FIG. 13 shows the fourth dual mass clutch flywheel during a relative displacement between the primary and secondary mass in a section through the two masses identical to the section shown in FIG. 11;

FIG. 15 shows a spring-damper arrangement in a section along XV-XV in FIG. 16;

FIG. 16 shows the spring-damper arrangement according to FIG. 15 in a section along line XVI-XVI in FIG. 15.

FIG. 17 shows a spring-damper arrangement in a section along line XVII-XVII in FIG. 18;

FIG. 18 shows the spring-damper arrangement according to FIG. 17, in a section along line XVIII-XVIII in FIG. 17;

FIG. 27 shows a diagrammatic view of a further friction device in a similar representation to that shown in FIG. 22;

FIG. 28 shows the arrangement according to FIG. 27 in a similar representation to that shown in FIG. 20;

FIG. 31 shows the friction device according to FIGS. 29 and 30, during a relative displacement of the two masses of the dual mass clutch flywheel in a similar representation to that shown in FIG. 29, in a section along line XXXI-XXXI in FIG. 32;

FIG. 32 shows the friction device according to FIG. 31, in a section along line XXXII-XXXII in FIG. 31;

DETAILED DESCRIPTION OF PREFERRED EMBODIMENTS

Figure 5:
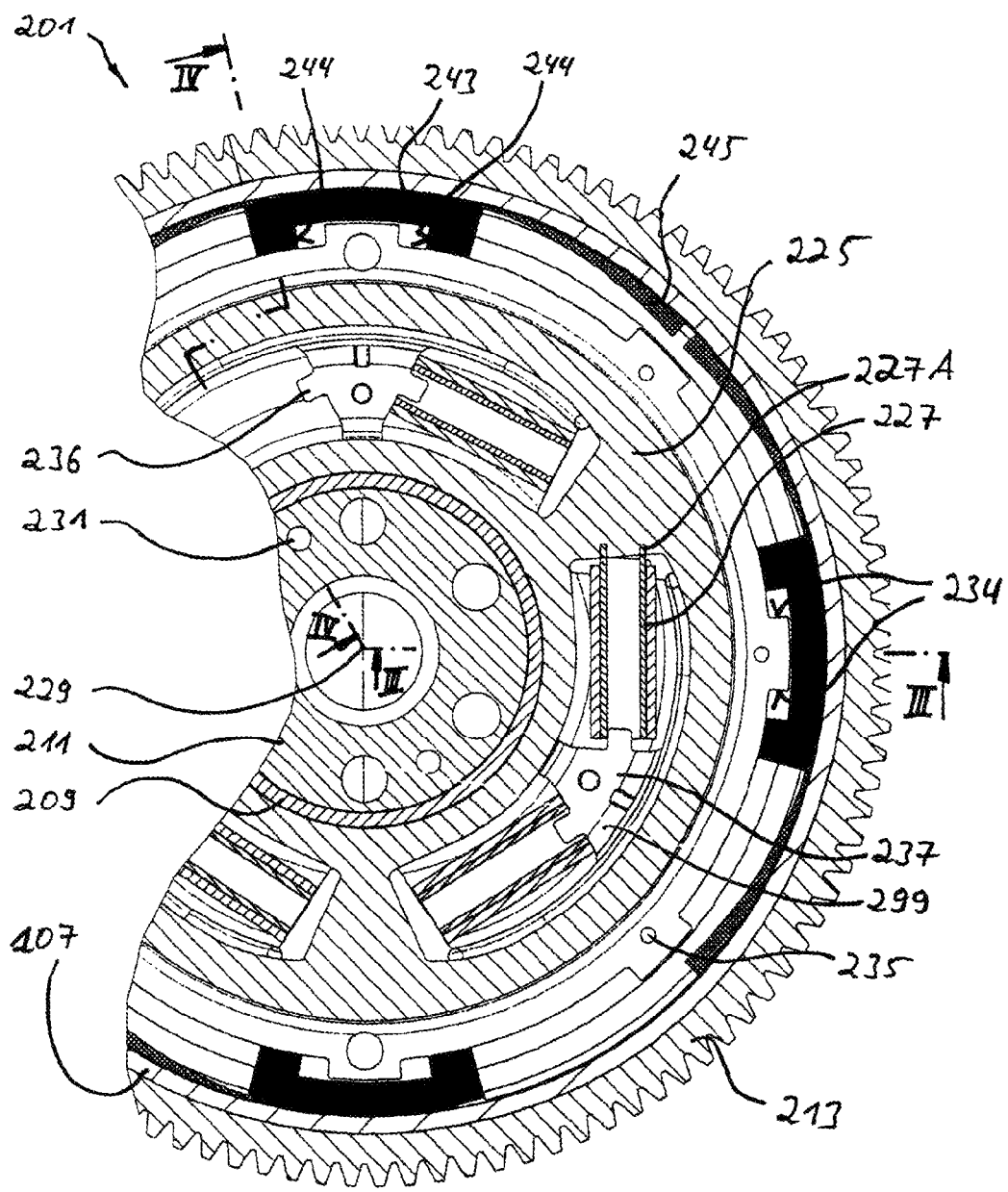
FIG. 5 shows the second dual mass clutch flywheel in cross-section along line V-V in FIGS. 3 and 4.

Dual mass clutch flywheel 101 shown in FIGS. 1 and 2 comprises a primary mass 103 and a secondary mass 105. Here primary mass 103 comprises a primary steel plate 107 and a centring hub 109. Furthermore, primary plate 107 supports a starting ring gear 113. Secondary mass 105 comprises essentially a secondary plate 115 which is pivoted on centring flange 109 by a sliding bearing 117.

In addition to this pivoting, the two masses 103 and 103 interact with each other by means of a spring-damper arrangement 119. This spring-damper arrangement 119 comprises a spring part 121 and a friction part 123. Here it is self-evident that spring part 121 has not only a resilient action but also a frictional and hence a damping or energy eliminating action, whilst friction part 123 may also have resilient characteristics within certain limits.

In dual mass clutch flywheel 101 shown in FIGS. 1 and 2, components are provided on both the primary and secondary sides which provide an active connection from the corresponding mass 103 or 105 to the spring-damper arrangement 119 or spring part 121 and damper part 123 respectively.

On the primary side this is, relative to spring part 121, a primary double spring washer 125 which surrounds springs 127 of spring part 121 and which is positioned rigidly on central flange 109 by a screwed connection through screw holes 131, relative to the primary mass 103 or relative to primary plate 107, central flange 109 and spacer plate 111. Correspondingly, secondary mass 105 has a secondary side spring washer 133 which is positioned on secondary plate 115 by means of a riveted joint in openings 135, and also surrounds springs 127. Spring part 121 also comprises a free spring plate 137 or fly wheel 199, which serves to position springs 127.

Damper part 123 comprises on the primary side two pressure discs 139 and 140 and wedges 143 and 145, which are axially clamped to each other by means of a cup spring 141, which is arranged between wedge 145 and pressure disc 140. Wedges 143 and 145 have strengths that vary in the peripheral direction. Here one of wedges 143, 145, namely wedge 143 in contact with pressure disc 139, has a rotary connection to secondary side spring washer 133 of secondary mass 105, wherein wedge 143, in the peripheral direction, has stops 144 against which secondary side spring washer 133 also blocks stops 134 at certain swivel angles. Pressure disc 139 is designed as a sliding disc on which wedges 143 are able to slide. Wedges 145 are rigidly connected to cup spring 141 and pressure disc 139, wherein cup spring 141 is in turn rigidly connected by pressure disc 130 to primary plate 107, which has been fixed in a groove of the primary plate, not referenced. As a result of this arrangement frictional forces that vary between the two masses 103 and 105 can be generated over the swivel angle.

Moreover, FIG. 1 shows the possibility of installing a dual mass clutch flywheel according to the invention in which secondary plate 115 is connected by screws 157 to a clutch housing 159 which in turn supports a clutch pressure plate 149 with a cup spring 161, which spring presses clutch pressure palate 149 against a friction disc 163 which is clamped between clutch pressure plate 149 and secondary plate 115. The entire arrangement is arranged in a clutch space 167.

If the end of cup spring 161 located radially inside is loaded by a central disengaging element, friction disc 163 is relieved and the corresponding clutch is therefore opened.

In the closed condition, on the other hand, a torque is transmitted from a drive shaft, which is connected to primary mass 103 by screws which are arranged in screw openings 171 of components 107, 109, 11 and 125, via primary mass 103, spring-damper arrangement 119 and secondary 105, as well as clutch pressure plate 149, to friction disc 163 and hence to a driven shaft 165 connected to friction disc 163.

Figures 3, 4:
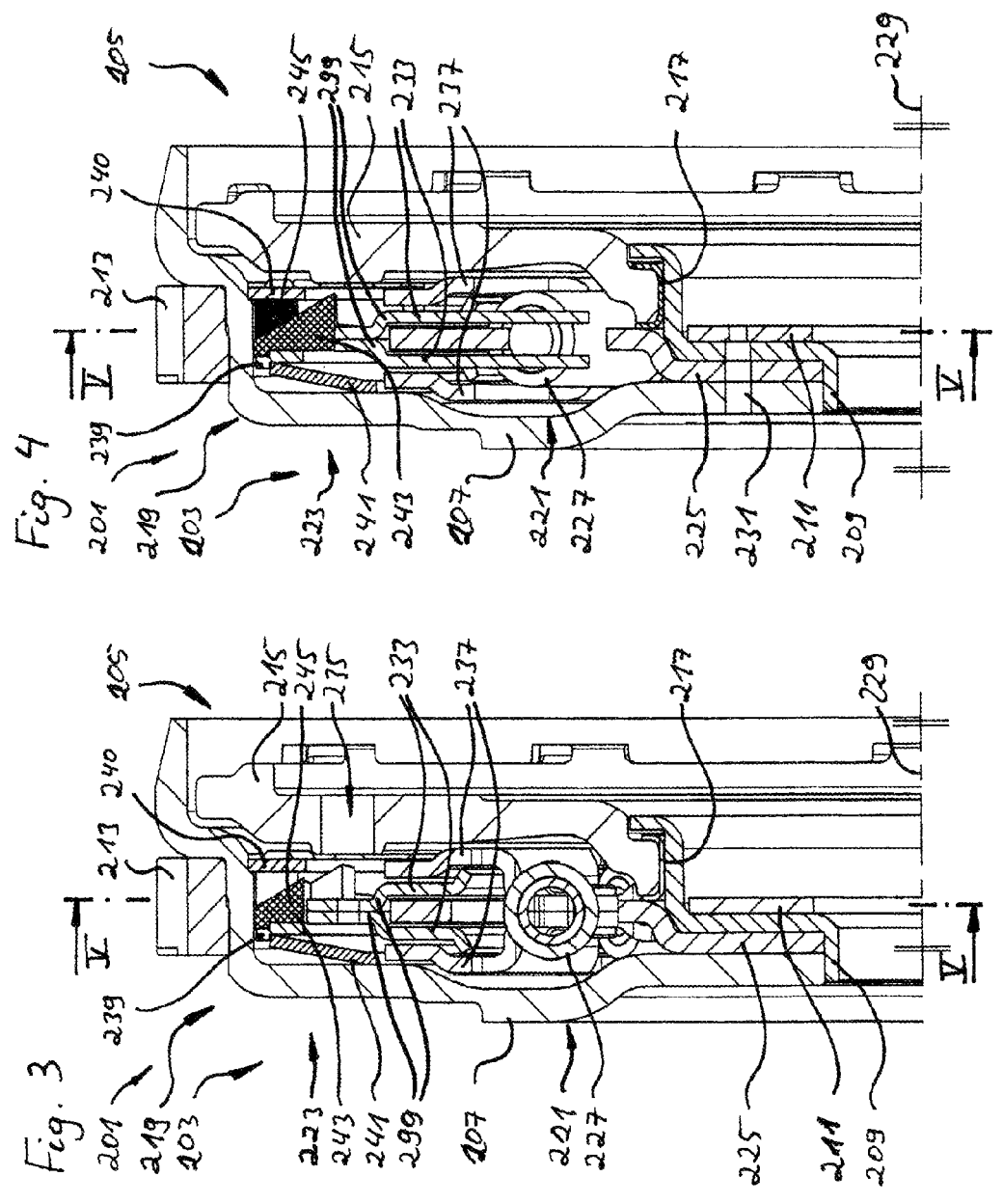

The arrangement shown in FIGS. 3 to 6 differs only slightly from the arrangement shown in FIGS. 1 and 2, so that no detailed description of this arrangement is given. In conformity with this, the same figures are also used to denote components with the same actions, wherein they comprise number 2 in their first position instead of number 1. One difference is that in this embodiment a screw plate 211 is provided which rests on central flange 209 on the clutch side and serves for a better fixing of the screws with which dual mass clutch flywheel 201 is secured on the primary side to a drive shaft.

In dual mass clutch flywheel 201 shown in FIGS. 3 to 6, components are provided on both the primary and secondary sides which provide an active connection from the corresponding mass 203 or 205 to the spring-damper arrangement 219 and the spring part 221 and damper part 223 respectively.

On the primary side this is, relative to spring part 221, a primary spring washer 225 which surrounds springs 227 of spring part 221 and which is rigidly positioned on central flange 209 by means of a screw connection through screw holes 231, in relation to primary mass 203 or relative to primary plate 207, central flange 209 and screw plate 211. Correspondingly secondary mass 205 has a double plate 233 which is positioned by means of a riveted joint in openings 235 on secondary plate 215, and also surrounds springs 227. Spring part 221 also comprises a double free spring plate 237 or fly ring 299 which serves to position springs 227.

As can be seen immediately by comparing these first two exemplary embodiments, it does not matter whether the primary side spring plate, the secondary side spring plate or the free spring plate are of dual design or as a single plate. Preferably one of the two plates belonging to the masses is of dual design and the other of single design, so that they can be arranged in a radially identical position without difficulty and are able to grip the springs. Preferably the plates here are of dual design, preferably with the same strength and made from identical material, so that they can be manufactured from one material, preferably a steel plate. It is particularly advantageous if both these components are designed symmetrically so that the identical tool can also be used for this purpose.

Figure 7:
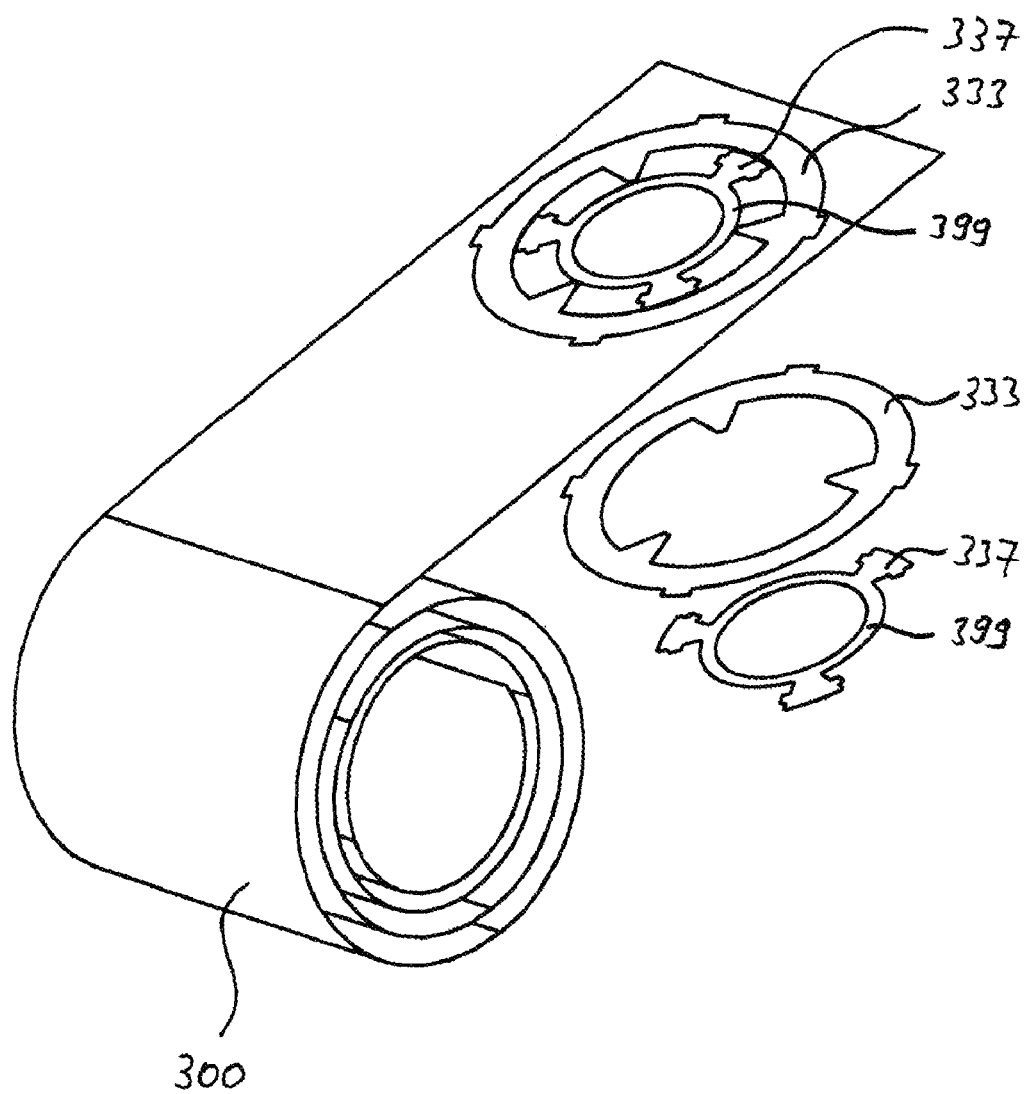
FIG. 7 shows a possible method of manufacturing a free spring plate and a corresponding primary and secondary side plate.

Moreover, as can also be seen from these first two exemplary embodiments, the free spring plate may be designed with the same strength and from identical material as the primary side or secondary side spring plate. Here it does not matter whether the plate is of a dual or single design. Since free spring plate 337 or fly ring 399 runs essentially on a different radius, in the same way as at least one of the two primary or secondary side plates, it can be manufactured not only from the same material but also from the identical area of a steel plate 30, from which the corresponding primary or secondary side plate 333 is also manufactured, as shown in FIGS. 7 to 9. This represents considerable material cost savings, to the extent that absolutely no extra material costs need be incurred by the free spring plate.

Damper part 223 comprises on the primary side two pressure discs 239 and 240 which are axially clamped to each by means of a cup spring 241, and between which are arranged wedges 243 and 245 which are pressed against each other by cup spring 241 and have strengths that vary in the peripheral direction. Here one of wedges 243, 245, namely wedge 243 lying radially on the inside has a rotary connection to double plate 233 of secondary mass 205, wherein wedge 243 has stops in the peripheral direction, against which stops double plate 233 also blocks stops 234 at certain swivel angles. wedges 245 are rigidly connected to pressure disc 240, which is in turn rigidly connected to primary plate 207 by means of a crimp connection. The cup spring is connected to primary plate 207 and pressure disc 239 by a clamping connection acting in the peripheral direction, so that both cup spring 241 and pressure disc 239 are designed rigidly relative to primary mass 203. Wedges 243, on the other hand, may perform a relative movement relative to pressure disc 239 and hence also relative to primary mass 203. As a result of this arrangement frictional forces varying between the two masses 203 and 205 can be generated over the swivel angle.

The arrangement shown in FIGS. 10 and 11 corresponds essentially to parts of the arrangement shown in FIGS. 3 to 6, so that no descriptions are repeated in respect of the correspondences. The components with similar actions are provided with identical reference numbers for the sake of simplification, except for the first position.

An essential difference between these exemplary embodiments is the arrangement of springs parts 221 and 421 and damper parts 223 and 423 respectively. Whilst spring parts 221 are a shorter distance from the main axis of rotation 229 than damper parts 223 in the embodiment shown in FIGS. 3 to 6, the conditions in the embodiment shown in FIGS. 10 and 11 are the reverse in this respect. Here spring part 421 has a radially further from the main axis of rotation 429 than damper pat 423.

However, the latter arrangement only appears to be possible, according to the invention, if the lowest friction and damping values are required by the springs. This can also be achieved, among other things, by a suitable window geometry of the corresponding plates surrounding springs 127 and 227 or 427 respectively. Here the windows expand preferably inwards in the peripheral direction, in particular from the side on which the springs rest. Preferably a saddle 128, 130 (see FIG. 2) is also provided on this side, on which saddle the springs are able to rest with stable guidance. If the two masses, the primary mass and secondary mass, are displaced relative to each other in such an arrangement, the contact side of one of the two masses is raised from the spring, whilst the contact side of the other mass supports the spring. On the opposite side of each window the conditions are the reverse. Because of the widening of the windows the window frame is separated from the spring during this relative movement between the spring end and the contact side so that the spring is only in contact with the saddle points and the contact sides which perform an identical relative movement. Any friction on the radial outer edge of the windows between the spring and the components surrounding the springs may therefore be minimized.

Unlike the exemplary embodiment shown in FIGS. 3 to 6, the arrangement according to FIGS. 10 and 11 has a primary side double plate 425, but this plate is only secured with a plate to central flange 409 by means of a spacer 411A, with the aid of a screw plate 411B. Double plate 425 is radially connected on the outside by a riveted, soldered, welded joint or a similar method. Here the primary side double plate 425 surrounds springs 427 from the outside, whilst a secondary side spring plate 433, which is riveted to secondary plate 405 by rivets 435, rests on springs 427 on the inside. The free spring plate 437 or fly ring 499 surrounds springs 427 from the outside sufficiently for the radial conditions to be the reverse of the exemplary embodiment shown in FIGS. 1 and 2 in this respect.

The design of the damper part 423 of the exemplary embodiment shown in FIGS. 10 and 11 also differs from all the other exemplary embodiments. Here primary side spring plate 425 secured to central flange 409 serves as a pressure and frictional surface with variable axial distance in the peripheral direction from secondary mass 405, on which wedges 443 can be displaced from secondary mass 405 with a certain clearance in the peripheral direction. Wedges 443 are pressed against primary side spring plate 425 by a pressure plate 440 an a cup spring 441 which is supported on the secondary plate. During a rotary displacement of the two masses 403 and 405 the wedges rub with a frictional force dependent on the axial position of primary side spring plate 425 by means of spring plate 425, so that energy is dissipated with a desired characteristic curve.

The arrangement shown in FIGS. 12 and 13 also corresponds essentially to the arrangements described above, so that there is no detailed explanation of the individual components, since they conform to the components already described, and identical reference numbers are used for these components, except for the first number. In this exemplary embodiment the radial arrangement of spring part 521 and damper part 523 of spring-damper device 519 corresponds essentially to the embodiment shown in FIGS. 1 and 2, wherein the structure of spring part 521 of the exemplary embodiment shown in FIGS. 12 and 13, including free spring plate 537 or fly ring 599, corresponds to the structure of spring part 121 of the exemplary embodiment shown in FIGS. 1 and 2, so that no detailed description is given in this respect. Secondary side spring plate 533 is also secured by means of a riveted joint 535. Furthermore, secondary spring plate 533, just as secondary side spring plate 133, engages by means of a shoulder in wedges 543 of damper part 523, but the latter has a similar structure to damper part 432 of the exemplary embodiment shown in FIGS. 10 and 11. Damper part 523 also comprises an axially varying primary side spring plate 525 on which wedges 543 are frictionally retained by a pressure disc 540. Pressure disc 540 is pressed by a cup spring 541 in the direction of primary spring washer 525, as a result of which compressive forces varying according to the relative positions of the two masses 503 and 505, and hence varying frictional forces are required, depending on the axial position of primary side spring plate 525, as is evident by comparing FIGS. 12 and 13 (or even FIGS. 10 and 11).

Furthermore, this exemplary embodiment comprises a relatively thin-walled primary side spring plate 525 which supports a primary side mass ring 507 with the ring gear 513 and extends axially outwards into this mass ring 507. Because primary side spring plate 525 is relatively thin-walled, it may also absorb axial impacts from a drive shaft, as a membrane, whilst the moment of inertia is supplied essentially by mass ring 507 and ring gear 513.

Figure 14:
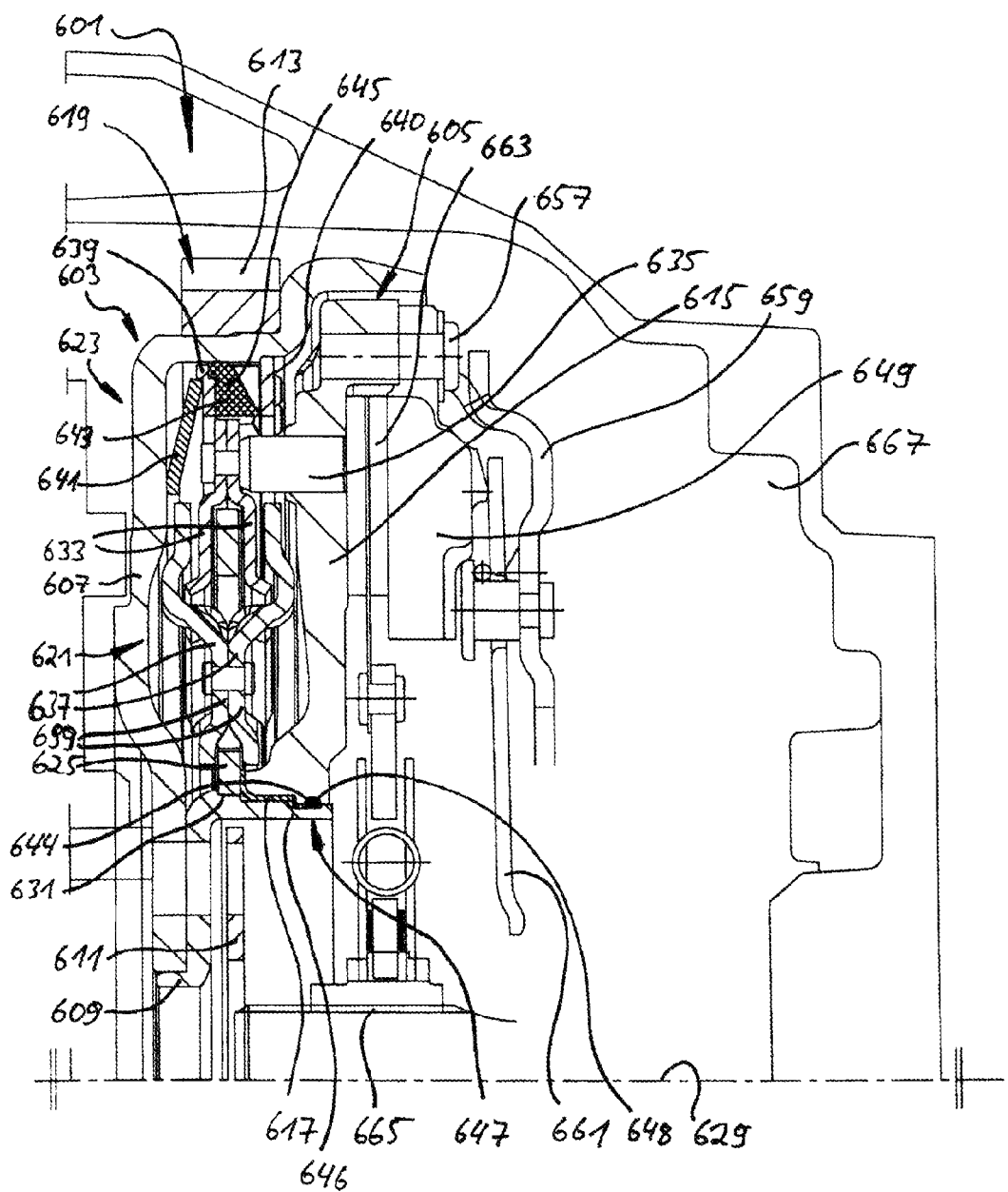
FIG. 14 shows a fifth dual mass clutch flywheel according to the invention in its installation position in a radial section similar to FIG. 1.
Figure 19:
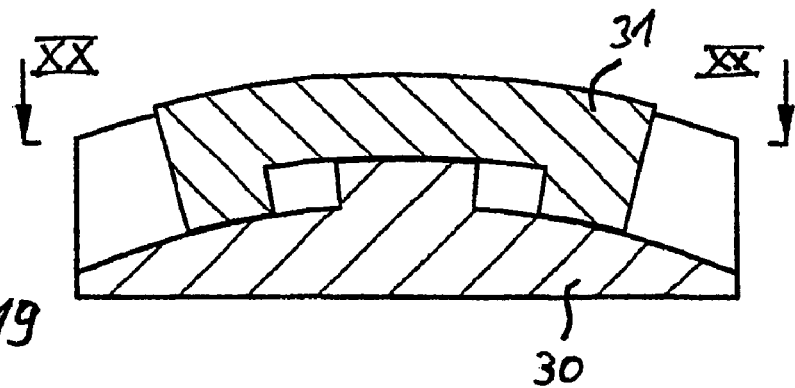
FIG. 19 shows a diagrammatic view of a friction device perpendicular to the main axis of rotation along line XIX-XIX in FIG. 20.
Figure 20:
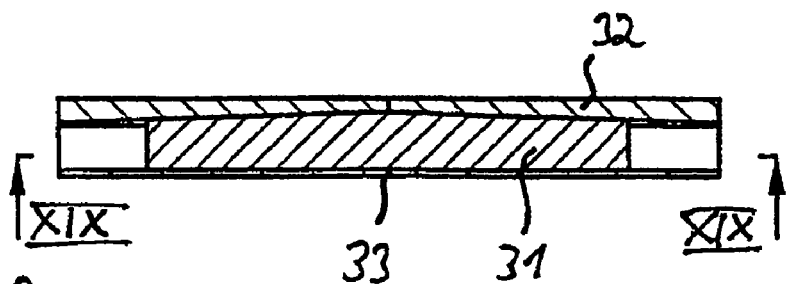
FIG. 20 shows the friction device shown in FIG. 19 in a section along line XX-XX in FIG. 19.
Figure 21:
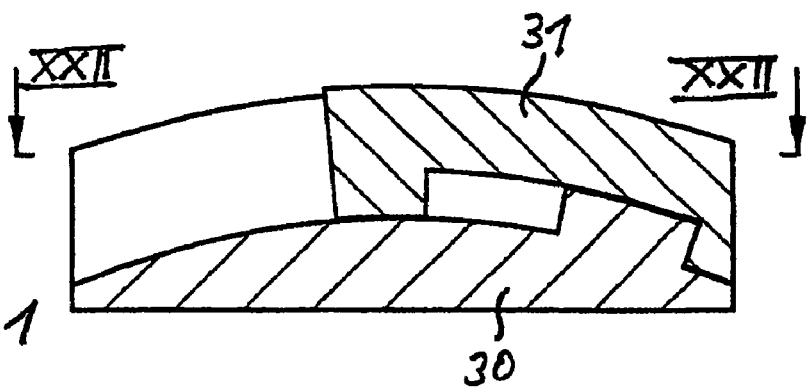
FIG. 21 shows the friction device according to FIGS. 19 and 20 during a relative displacement of the two masses of the dual mass clutch flywheel in a similar representation to that shown in FIG. 19, in a section along line XXI-XXI in FIG. 22.
Figure 22:
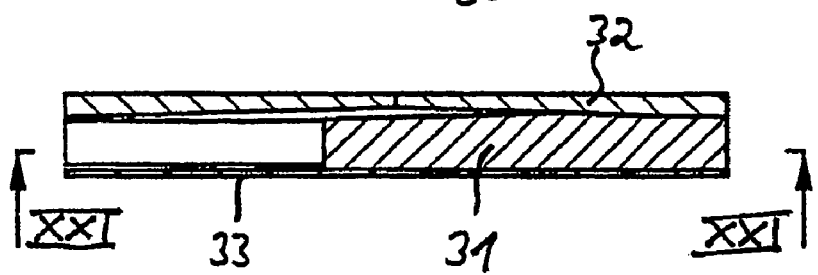
FIG. 22 shows the friction device according to FIG. 21 in a section along line XXII-XXII in FIG. 21.
Figure 23:
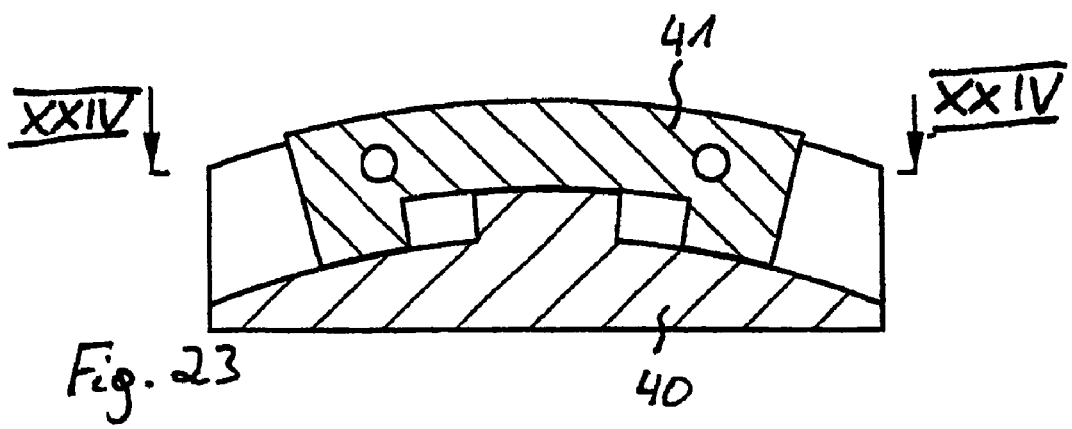
FIG. 23 shows a diagrammatic view of a further friction device in a similar representation to that shown in FIG. 19, along line XXIII-XXIII in FIG. 24.
Figure 24:
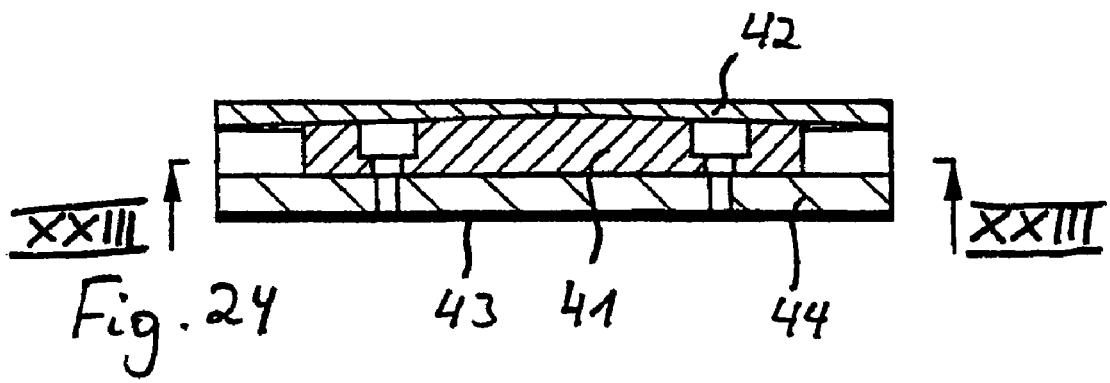
FIG. 24 shows the friction device according to FIG. 23, in a section along line XXIV-XXIV in FIG. 23.
Figure 25:
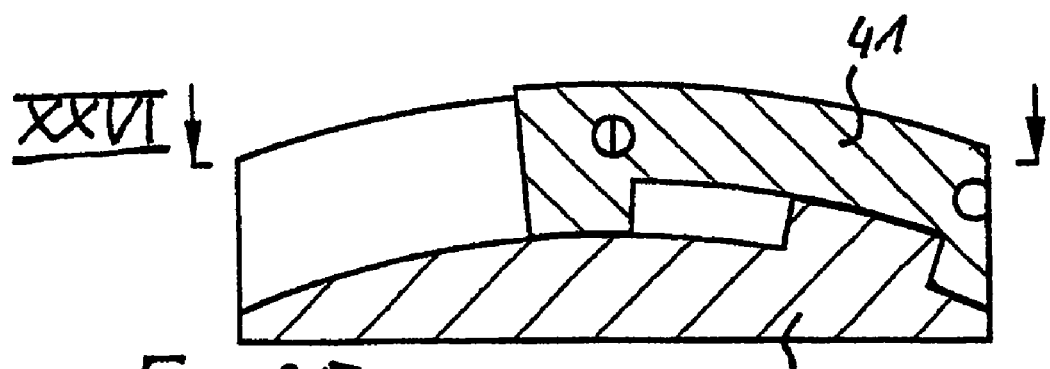
FIG. 25 shows the friction device according to FIGS. 23 and 24 during a relative displacement of the two masses of the dual mass clutch flywheel in a similar representation to that shown in FIG. 23 in a section along line XXV-XXV in FIG. 26.
Figure 26:
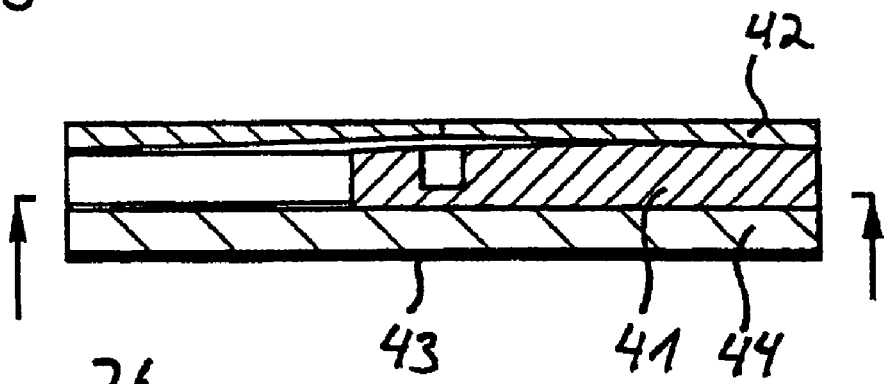
FIG. 26 shows the friction device according to FIG. 25, in a Section along line XXVI-XXVI in FIG. 25.
Figure 29:
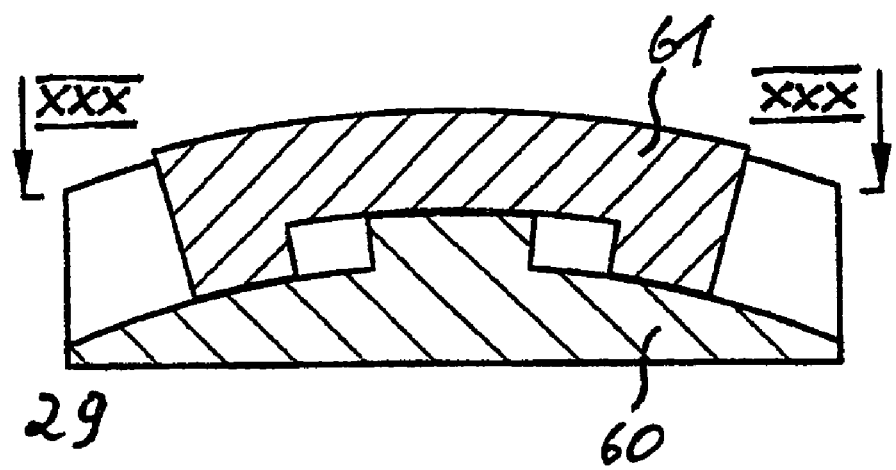
FIG. 29 shows a diagrammatic view of a further friction device in a similar representation to that shown in FIG. 19, in a section along line XXIX-XXIX in FIG. 30.
Figure 30:
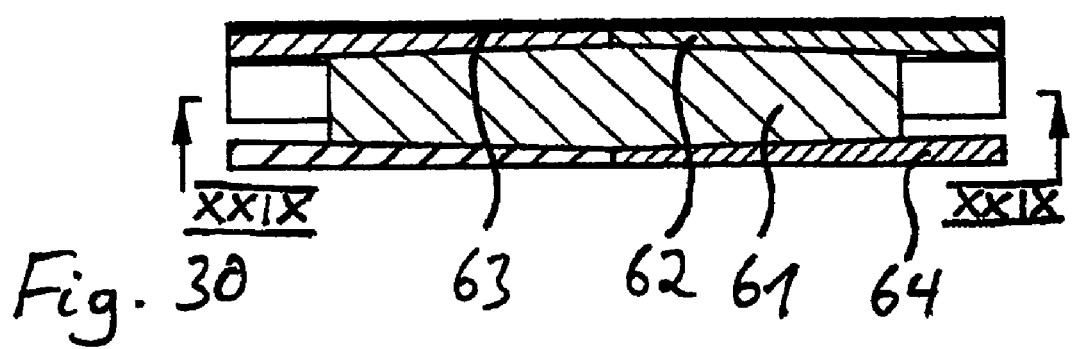
FIG. 30 shows the friction device according to FIG. 29, in a section along line XXX-XXX in FIG. 29.
Figure 33:
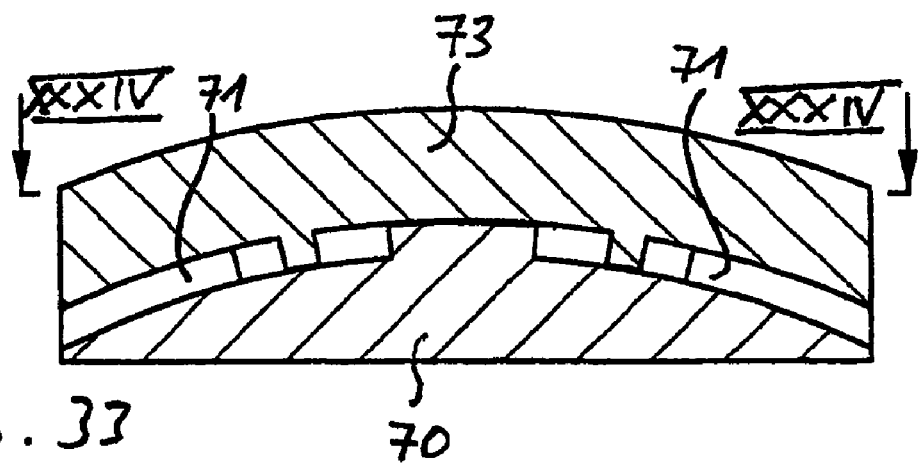
FIG. 33 shows a diagrammatic view of a further friction device in a similar representation to that shown in FIG. 19, in a section along line XXXIII-XXXIII in FIG. 34.
Figure 34:
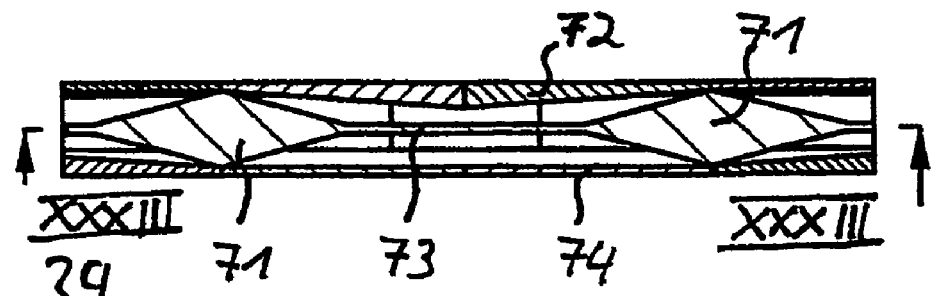
FIG. 34 shows the friction device according to FIG. 33 in a section along line XXXIV-XXXIV in FIG. 33.

The exemplary embodiment shown in FIG. 14 corresponds essentially to the exemplary embodiment shown in FIGS. 3 to 6, which is why no detailed explanation of the corresponding components is given here either, which components are denoted by identical reference numbers except for the first number.

In this exemplary embodiment secondary side double plate 633 and secondary plate 615 are connected to each other by a riveted joint 615 countersunk in the secondary plate. Such a connection has the advantage, when manufacturing the dual mass clutch flywheel, that secondary plate 615 only needs to be machined on one side. To this extent secondary plate 615 can be manufactured at low cost by relatively simple production methods, particularly casting, since it only needs to be re-machined on one side. This only relates to the flange of secondary plate 615 in the region in which sliding bearing 617 is provided. As can be seen immediately from FIG. 14, this can be carried out from the engine side or from the side facing primary mass 603 or the engine. During the subsequent riveting by means of rivets 635 the dimension for the riveted joint and hence the position between secondary plate 615 and secondary side double plate 633 can be determined from this engine side bearing surface on which sliding bearing 617 is later arranged.

A clip connection 647 is provided between secondary plate 615 and central flange 609, which connection axially positions secondary mass 605 relative to the primary mass. Clip connection 647 comprises a component 646 of central flange 609, a groove 647 in secondary plate 615 and a plastic ring 644, which is arrange din groove 648 and is surrounded by a nose of component 646. Whilst sliding bearing 617 positions secondary mass 605 and primary mass 603 against forces which move the two masses 603 and 605 toward one another, clip connection 647 positions both masses 603 and 605 against axial forces which move both of them away from each other. Here it can be seen immediately that clip connection 647 can be opened radially inwards by sufficiently large axial forces or by the deflection of components 646.

During opening, primary side spring plate 625, which is axially secured by a clamping connection 631 acting in the peripheral direction between sliding bearing 617 and a shoulder on centring flange 609, and secondary side double plate 633 can be axially removed together with secondary plate 615 from primary mass 603, since both connection 631 and the openings between wedges 145 do not prevent components 125 and 133 from axially separating from them. On the other hand, these components are fixed axially in relation to secondary plate 615 by rivets 635 and free spring plate 637 or fly ring 699.

Spring-damper arrangements 719 and 819 shown in FIGS. 15 to 18, unlike the previously described exemplary embodiments, each of which are connected in series by hold-down devices 136 and 236 respectively, have through springs 727 and 827 respectively, which are fixed in their central region by hold-down devices 736 and 836 respectively, provided on a flyer 737 and 837 or fly ring 799 and 899 respectively. To ensure that these hold-down devices 736 and 836 are able to engage well in springs 727 and 827 respectively, the latter have offset turns in the region of hold-down devices 736 and 836, so that the hold-down devices are able to engage well in the springs. As can easily be seen in the representation in FIG. 17, the offset turns may be dispensed with if necessary if hold-down device 836 is designed correspondingly smaller and are adapted to the spring radius. Otherwise these spring-damper arrangements also comprise primary and secondary plates 725 and 825 and 733 and 833 respectively, which surround springs 827 and form contact sides for the springs in the peripheral direction.

As is shown in FIG. 2 by way of example, the spaces provided in the peripheral direction by the primary side and secondary side of the dual mass clutch flywheel for springs 127 (shown in that figure merely symbolically as double lines) need not correspond. Consequently an idling spring constant may easily be provided at small relative angles between the two masses, which constant increases with the relative angles between the two masses according to the springs which are then also gripped. If necessary only one or two inner springs 227A need be designed longer and rest in corresponding recesses, as indicated by way of example in FIG. 5. It is self-evident that such a design of the spring parts is also advantageous independently of all the other characteristics of this invention.

Figure 5A:
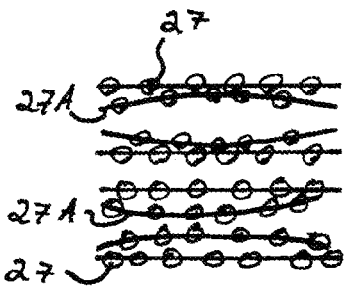
FIG. 5A shows bulbous inner springs for an alternative to the springs shown in FIG. 5.
Figure 6:
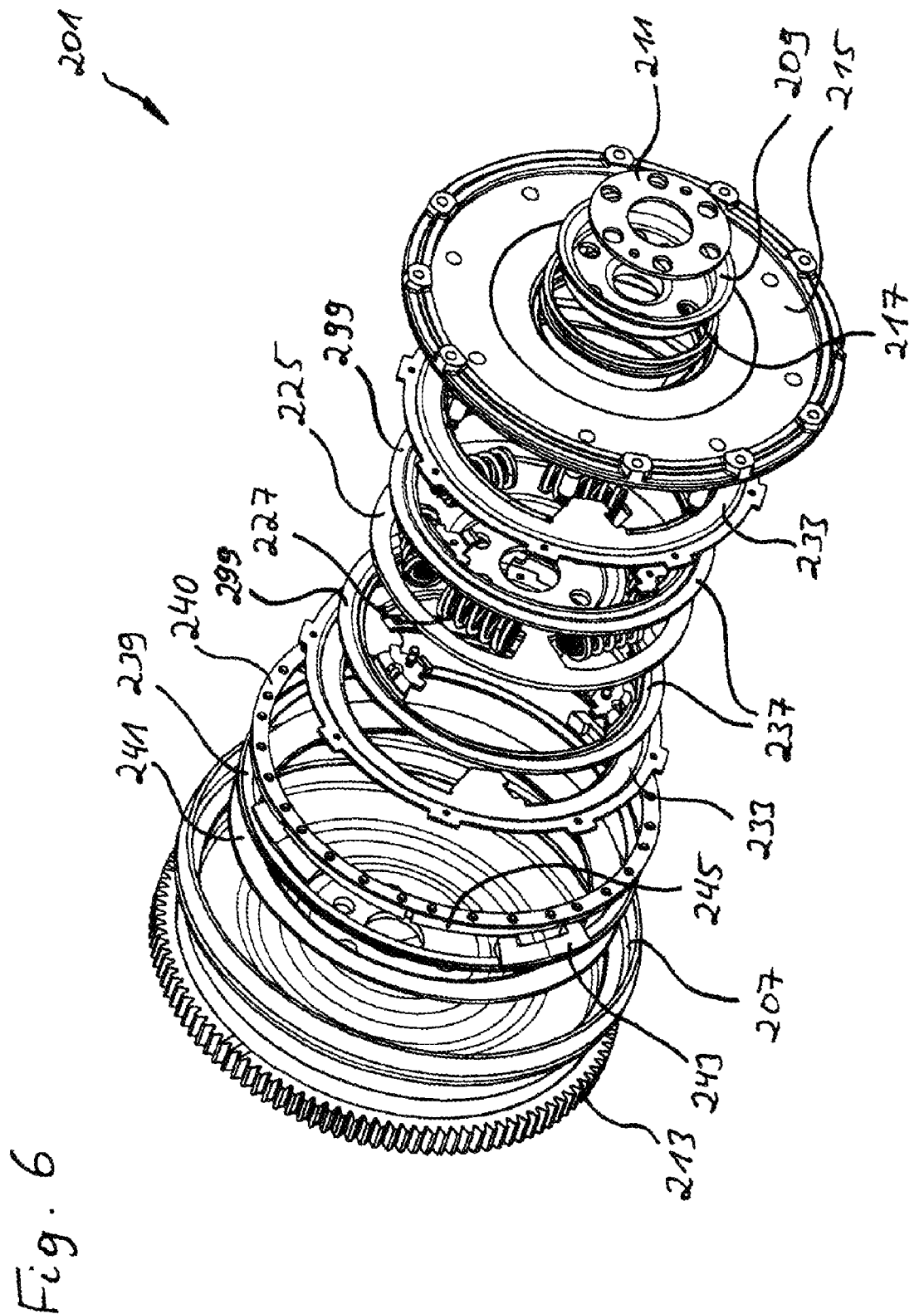
FIG. 6 shows the second dual mass clutch flywheel in an exploded view.

In order to minimize the friction losses in spring arrangements with a plurality of springs arranged inside one another, as shown by way of example in FIG. 5, the inner springs are bulbous in design, as shown by way of example in FIG. 5A. Even under centrifugal force only a few turns of inner springs 27A rest on outer spring or springs 27, so that losses due to friction between springs 27 and 27A are avoided. It is self-evident that such a design of the springs is also advantageous independently of all the other characteristics of this invention for functional separation of the spring part and damper part in a torsional vibration damper and, in particular, a dual mass clutch flywheel.

Depending on the specific requirements, only the inner springs are designed as through springs when springs that lie onside the other are used, whilst the other springs are split and gripped by a hold-down device. Here the inner springs are preferably either also gripped by a hold-down spring or are of bulbous design to minimize any friction between the springs.

As can already been seen from the exemplary embodiments described above, the damper parts may have different friction devices. Friction devices with frictional surfaces which have an axial component are preferably provided, i.e. the corresponding frictional surfaces have a surface whose normal vector has an axial component. This is advantageous because axially aligned surfaces rub against each other independently of the centrifugal force.

The friction device shown in FIGS. 19 to 22 comprises at least one friction wedge 31 with a recess in which a component 30 transmitting a torque, e.g. a component of the primary mass or the secondary mass, or a primary side or secondary side spring plate or the like, engages. After a certain idling angle component 30 stops on friction wedge 31 and carries it. Friction wedge 31 is also rigidly connected to a cup spring 33 which presses friction wedge 31 against a friction ramp ring 32. Because of the rigid connection between friction wedge 31 and cup spring 33, all components rubbing against each other are compensated for throughout the periphery in respect of their centrifugal forces.

The embodiment shown in FIGS. 23 to 26 corresponds essentially to the embodiment shown in FIGS. 19 to 22, but friction wedges 41 are secured to a pressure ring 43, as a result of which centrifugal forces are again compensated for. In addition, more uniform loading of friction wedges 41 can be guaranteed by pressure ring 43.

Whilst friction wedges 31 and 41 are preferably formed from a friction lining material, ramp rings 32 and 42 are formed both from friction lining material and metal. In the exemplary embodiment shown in FIGS. 27 and 28, a steel plate 52, in particular, is provided with an embossed friction ramp, against which friction wedges 51 are pressed by a cup spring 53 rigidly connected to friction wedges 51. A similar arrangement is also shown in the exemplary embodiments in FIGS. 10 to 13, in which primary side pressure plate 425 and 525 respectively are designed with friction ramps for wedges 443 and 543 respectively.

On the other hand a cup spring can also be of undulating design or formed with ramps or friction ramps in order to generate suitably varying compressive forces when interacting with further ramps or wedges.

As can be seen in FIGS. 29 to 32, a double wedge 61 may also be provided which is arranged between two ramp rings 62 and 64 and is clamped by a cup spring 63, in which case ramp rings 62 and 64 operate simultaneously as a pressure plate. This exemplary embodiment shows, in particular, that if necessary, instead of the clearance between components 60 and 61, a region without axial pitch can also be provided in the ramp rings around an idling position, in which region the wedges are easily displaceable. However, the friction in the latter embodiment is generally too high for idling disengagement because of the friction linings present.

Figure 35:
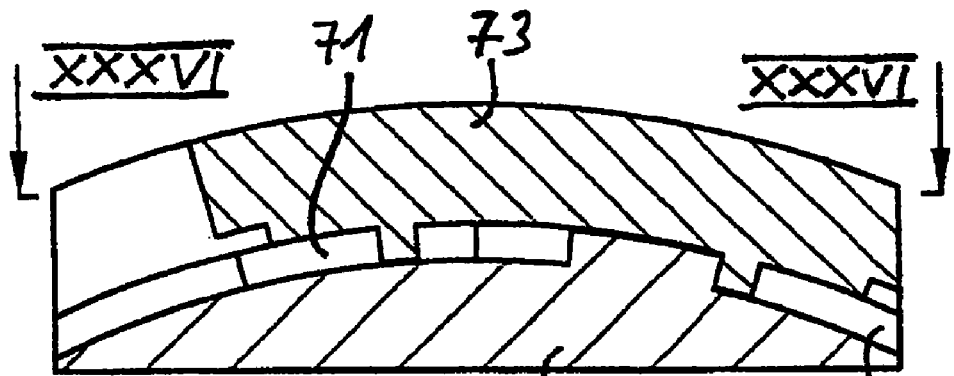
FIG. 35 shows the friction device according to FIGS. 33 and 34 during a relative displacement of the two masses of the dual mass clutch flywheel in a similar representation to that shown in FIG. 33, in a section alone line XXXV-XXXV in FIG. 36.
Figure 36:
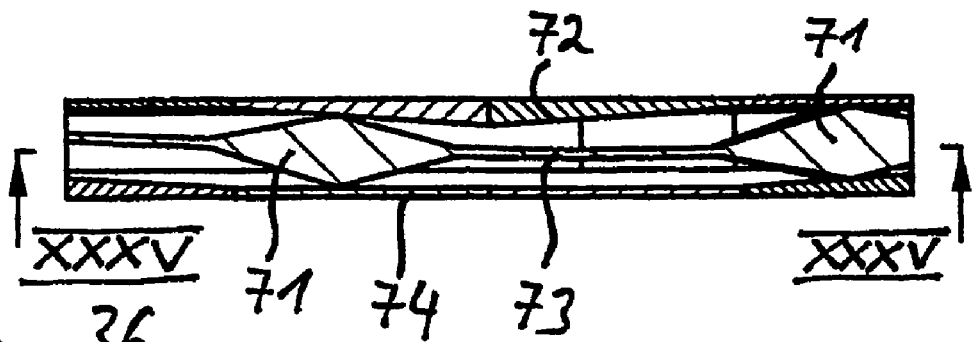
FIG. 36 shows the friction device according to FIG. 35 in a section along line XXXVI-XXXVI in FIG. 35.
Figure 37:
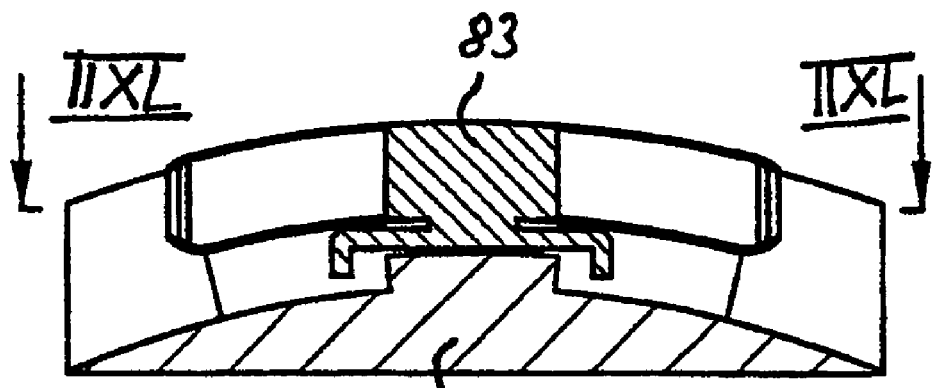
FIG. 37 shows a diagrammatic view of a further friction device in a similar representation to that shown in FIG. 19, in a section along line XXXVII-XXXVII in FIG. 38.
Figure 38:
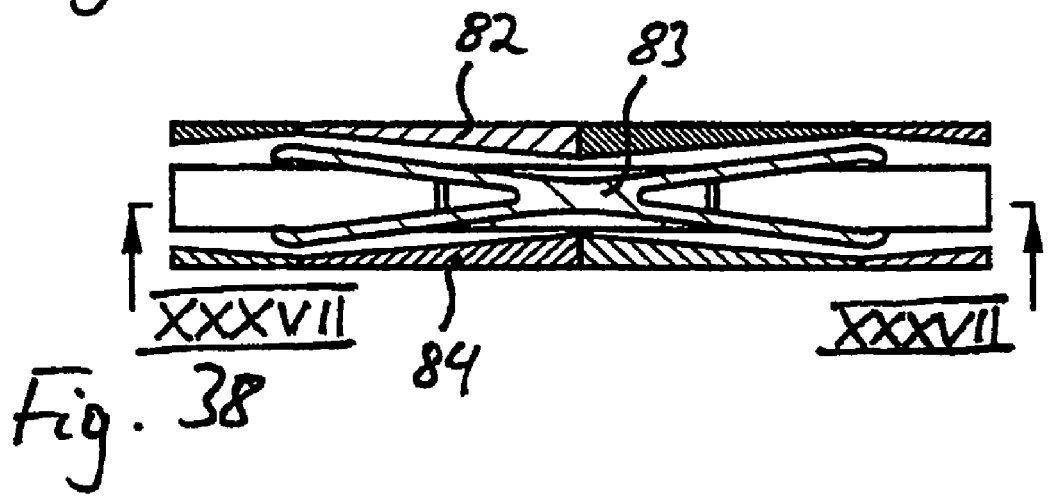
FIG. 38 shows the friction device according to FIG. 37; in a section along line IIXL-IIXL in FIG. 3.
Figure 39:
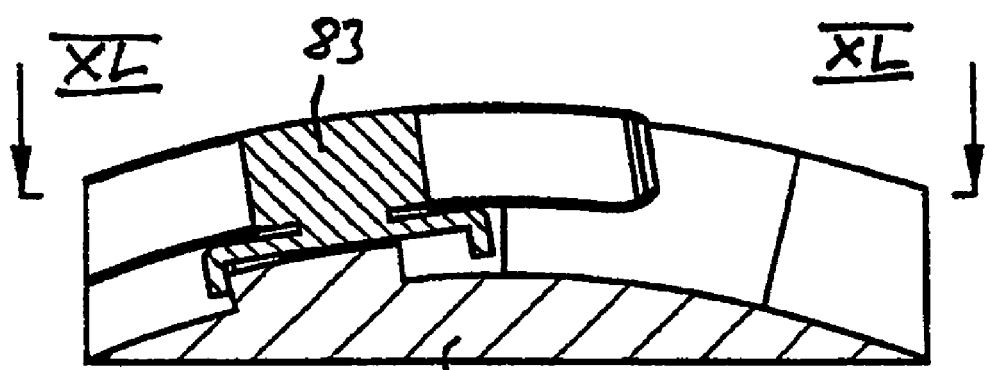
FIG. 39 shows the friction device according to FIGS. 37 and 38 during a relative displacement of the two masses of the dual mass clutch flywheel in a similar representation to that shown in FIG. 37 in a section along IXL-IXL in FIG. 40.
Figure 40:
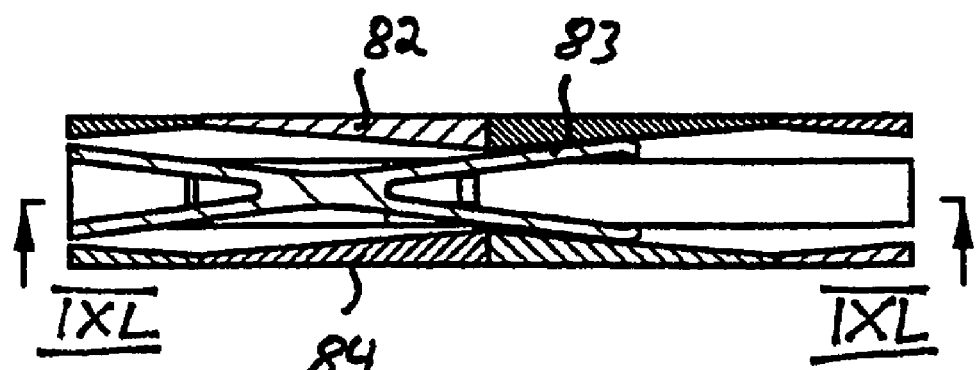
FIG. 40 shows the friction device according to FIG. 39 in a section alone line XL-XL in FIG. 39.

As can be seen in particular in the exemplary embodiments shown in FIGS. 33 to 40, the cup spring need not be provided on the primary side or secondary side. It may instead be a flying component which is rigidly connected to friction wedges 71, for example, as show in particular in FIGS. 33 to 36. Here two ramp rings 72 and 74 are provided, whilst cup spring 73 is mounted in a flying manner between these ramp rings 72 and 74 and supports wedges 71. When the two masses swivel, and when the two ramp rings 72 and 74 also swivel, they grip wedges 71 and deflect them from the spring plane of cup spring 73, in consequence of which readjusting forces are required, as shown in FIGS. 35 and 36. In this exemplary embodiment ramp rings 72 and 74 are preferably of metal, whilst friction wedges 72 consist preferably of a friction material and are mounted on cup spring 73. On the other hand the friction wedges may also be designed integral with the cup spring, in which case the ramp rings may then consist of friction material. Particularly when the latter is the case, spring elements 83 may also be provided instead of a cup spring, which elements may rub with spring arms against the ramps of ramp rings 82 and 84, as shown by way of example in FIGS. 37 to 40.

The friction devices shown in FIGS. 19 to 40 have frictional surfaces which is essentially axially aligned, as can be seen immediately in the figures. In particular, the frictional surfaces vary around the periphery in their axial position in order to supply correspondingly varying compressive forces, preferably provided by a resilience, and hence to supply frictional forces, so that a characteristic line that is dependent on the relative swivel angle can easily be achieved.

What is claimed is:

1. A dual mass clutch flywheel that is able to rotate about a main axis of rotation and comprises two masses and a torsional vibration damper, which is capable of damping rotary vibrations using a spring damper device acting between the two masses, with a spring system and a damper system, wherein, in a load-free condition, both masses are able to rotate in an idling position about a main axis of rotation, and in a loaded condition are able to rotate against the spring-damper device about a main axis of rotation, offset by a relative angle to each other, wherein the spring system has rectilinear springs which are guided by hold-down devices radially to the main axis of rotation, which devices are connected to each other by means of a fly ring, wherein the springs are freely mounted, at least in the region of the hold-down device, wherein the fly ring is freely able to follow the springs at least over a small relative idling angle around the idling position, and wherein the spring system applies less than 10% of the maximum friction of the spring-damper device, compared to said damper system.

2. The dual mass clutch flywheel according to claim 1, wherein the spring system and the damper system are arranged on different radii of the main axis of rotation.

3. The dual mass clutch flywheel according to claim 2, wherein the damper system is arranged radially outwards.

4. The dual mass clutch flywheel according to claim 1, wherein plates, which transmit torque from one of the two masses to the spring-damper device and are of dual design, are made up of identical material with the same strength.

5. The dual mass clutch flywheel according to claim 4, wherein both plates are symmetrical to each other.

6. The dual mass clutch flywheel according to claim 1, wherein a flying spring plate is made up of identical material, with the same strength, to that of a primary side or secondary side plate which transmits torque from one of the two masses to the spring-damper device.

7. The dual mass clutch flywheel according to claim 1, wherein components on which the springs rest, but from which they are raised in the peripheral direction during a relative movement of the two masses of a dual mass clutch flywheel, expand in the direction of the springs on sides of the components lying radially outwards of the springs, so that they are separated from the springs in the radially outward direction during the relative movement of the two masses.

8. The dual mass clutch flywheel according to claim 7, wherein a saddle, on which the springs are able to rest, being guided radially stably, is provided.

9. The dual mass clutch flywheel according to claim 1, wherein a primary side spring plate comprises a membrane.

10. The dual mass clutch flywheel according to claim 1, wherein a component of a secondary mass transmitting a torque in the direction of a primary mass is connected to a secondary plate using a riveted joint countersunk in the secondary plate.

11. The dual mass clutch flywheel according to claim 10, wherein the secondary plate is machined on one side.

12. The dual mass clutch flywheel according to claim 1, wherein at least one plate transmitting a torque interacts frictionally and directly with a friction element.

13. The dual mass clutch flywheel according to claim 12, wherein the plate has a nonplanar frictional surface that varies in the axial direction in a peripheral region in which the friction element can be found.

14. The dual mass clutch flywheel according to claim 1, wherein the hold-down devices each engage in a spring and/or pass through it from the inside.

15. The dual mass clutch flywheel according to claim 1, wherein the springs are arranged in spring arrangements having inner springs of bulbous design.

16. The dual mass clutch flywheel according to claim 1, comprising a first friction device, which has at least one first frictional surface whose height varies axially.

17. The dual mass clutch flywheel according to claim 16, wherein the at least one first frictional surface is aligned essentially axially to a second frictional surface of a second friction device.

18. The dual mass clutch flywheel according to claim 1, comprising a friction device which has at least one nonplanar frictional surface having dimensions varying peripherally in the axial direction.

19. The dual mass clutch flywheel according to claim 1, comprising a friction device which comprises at least two wedges which are secured to an axially circulating component.

20. The dual mass clutch flywheel according to claim 1, comprising a friction device which comprises friction wedges and/or friction ramps or friction ramp rings of stiff materials.

21. The dual mass clutch flywheel according to claim 1, comprising a friction device which comprises friction wedges and/or friction ramps or friction ramp rings of friction lining materials.

22. The dual mass clutch flywheel according to claim 1, comprising a friction device with a metal ramp ring.

23. A clutch with a clutch flywheel according to claim 1, and with a pressure plate and a friction disc that can be gripped by the pressure plate and the clutch flywheel.

24. A dual mass clutch flywheel that is able to rotate about a main axis of rotation and comprises two masses and a torsional vibration damper, which is capable of damping rotary vibrations using a spring damper device acting between the two masses, with a spring system and a damper system, wherein in a load-free condition, both masses are able to rotate in an idling position about a main axis of rotation, and in a loaded condition are able to rotate against the spring-damper device about a main axis of rotation, offset by a relative angle to each other, wherein the spring system has springs which, under operating conditions, do not rub radially outwards against components performing movements relative to the springs, wherein the springs are freely mounted, at least in the region of a hold-down device, and wherein the spring system and the damper system of the spring-damper device are arranged on different radii of the main axis of rotation, and wherein the damper system is arranged radially outwards of the spring system, and wherein the spring system applies less than 10% of the maximum friction of the spring-damper device, compared to said damper system.

* * * * *